US010506678B2

(12) United States Patent
Harris et al.

(10) Patent No.: US 10,506,678 B2
(45) Date of Patent: Dec. 10, 2019

(54) MODULAR LIGHTING CONTROL

(75) Inventors: Michael J. Harris, Cary, NC (US);
Paul Pickard, Morrisville, NC (US)

(73) Assignee: IDEAL Industries Lighting LLC,
Sycamore, IL (US)

( * ) Notice: Subject to any disclaimer, the term of this patent is extended or adjusted under 35 U.S.C. 154(b) by 322 days.

(21) Appl. No.: 13/589,928

(22) Filed: Aug. 20, 2012

(65) Prior Publication Data

US 2014/0001972 A1    Jan. 2, 2014

Related U.S. Application Data

(60) Provisional application No. 61/666,920, filed on Jul. 1, 2012.

(51) Int. Cl.
*H05B 33/08* (2006.01)
*H05B 37/02* (2006.01)

(52) U.S. Cl.
CPC ..... *H05B 33/0842* (2013.01); *H05B 33/0806* (2013.01); *H05B 33/0809* (2013.01); *H05B 37/0254* (2013.01); *H05B 37/0263* (2013.01); *H05B 37/0272* (2013.01); *Y02B 20/348* (2013.01)

(58) Field of Classification Search
USPC ........ 315/149–153, 155, 158, 159, 291–294, 315/307–309, 362
See application file for complete search history.

(56) References Cited

U.S. PATENT DOCUMENTS

| 6,137,408 A | 10/2000 | Okada |
| 6,528,954 B1 | 3/2003 | Lys et al. |
| 7,009,348 B2 | 3/2006 | Mogilner et al. |
| 7,391,297 B2 | 6/2008 | Cash et al. |
| 7,638,743 B2 | 12/2009 | Bartol et al. |

(Continued)

FOREIGN PATENT DOCUMENTS

| JP | H11345690 A | 12/1999 |
| JP | 2001155870 A | 6/2001 |

(Continued)

OTHER PUBLICATIONS

Non-Final Office Action for U.S. Appl. No. 13/782,040, dated May 8, 2013, 10 pages.

(Continued)

*Primary Examiner* — Minh D A
*Assistant Examiner* — James H Cho
(74) *Attorney, Agent, or Firm* — Withrow & Terranova, P.L.L.C.

(57) ABSTRACT

The present disclosure relates to a modular lighting system that may include a driver module, an array of LEDs that are driven by the driver module, and a control module. The control module is configured to control the driver module, which in turn drives the LEDs of the array of LEDs in a desired fashion. The control module may communicate with one or more remote lighting control systems through wired or wireless communications and function to control the driver module accordingly. Notably, the driver module and the control module communicate with each other through a standard communication protocol, such that either of the driver module or the control module can be replaced without replacing the other of the driver module or control module. Further, power may be provided to the control module and the array of LEDs by the driver module via the standard communication interface or separate power interface.

13 Claims, 16 Drawing Sheets

(56) References Cited

U.S. PATENT DOCUMENTS

| | | | |
|---|---|---|---|
| 7,683,301 B2 | 3/2010 | Papamichael et al. | |
| 7,924,174 B1 | 4/2011 | Gananathan | |
| 8,013,545 B2* | 9/2011 | Jonsson | 315/318 |
| 8,035,320 B2 | 10/2011 | Sibert | |
| 8,269,376 B1 | 9/2012 | Elberbaum | |
| 8,461,781 B2 | 6/2013 | Schenk et al. | |
| 8,508,137 B2* | 8/2013 | Reed | 315/152 |
| 8,564,215 B2* | 10/2013 | Okawa et al. | 315/210 |
| 8,610,377 B2 | 12/2013 | Chemel et al. | |
| 8,626,318 B2* | 1/2014 | Wu | 700/11 |
| 8,786,191 B2* | 7/2014 | Kuang et al. | 315/77 |
| 8,952,627 B2 | 2/2015 | Tomiyama et al. | |
| 8,981,671 B2 | 3/2015 | Karasawa et al. | |
| 9,326,358 B2 | 4/2016 | Campbell et al. | |
| 9,351,381 B2 | 5/2016 | Verfuerth et al. | |
| 9,504,133 B2 | 11/2016 | Verfuerth et al. | |
| 9,538,617 B2 | 1/2017 | Rains, Jr. et al. | |
| 2006/0044152 A1 | 3/2006 | Wang | |
| 2007/0013557 A1 | 1/2007 | Wang et al. | |
| 2007/0132405 A1 | 6/2007 | Hillis et al. | |
| 2009/0021955 A1 | 1/2009 | Kuang et al. | |
| 2009/0026966 A1 | 1/2009 | Budde et al. | |
| 2009/0237011 A1 | 9/2009 | Shah et al. | |
| 2009/0267540 A1 | 10/2009 | Chemel et al. | |
| 2009/0284169 A1 | 11/2009 | Valois | |
| 2009/0315485 A1 | 12/2009 | Verfuerth et al. | |
| 2010/0070100 A1 | 3/2010 | Finlinson et al. | |
| 2010/0280676 A1 | 11/2010 | Pabon et al. | |
| 2010/0301773 A1 | 12/2010 | Chemel et al. | |
| 2010/0301774 A1 | 12/2010 | Chemel et al. | |
| 2010/0308664 A1 | 12/2010 | Face et al. | |
| 2011/0095687 A1* | 4/2011 | Jonsson | F21K 9/135 315/51 |
| 2011/0095709 A1 | 4/2011 | Diehl et al. | |
| 2011/0140612 A1 | 6/2011 | Mohan et al. | |
| 2011/0254554 A1 | 10/2011 | Harbers | |
| 2012/0040606 A1 | 2/2012 | Verfuerth | |
| 2012/0086345 A1 | 4/2012 | Tran | |
| 2012/0091915 A1 | 4/2012 | Ilyes et al. | |
| 2012/0139426 A1 | 6/2012 | Ilyes et al. | |
| 2012/0147604 A1 | 6/2012 | Farmer | |
| 2012/0153840 A1 | 6/2012 | Dahlen et al. | |
| 2012/0161643 A1 | 6/2012 | Henig et al. | |
| 2012/0280638 A1 | 11/2012 | Pereira et al. | |
| 2013/0013091 A1 | 1/2013 | Cavalcanti et al. | |
| 2013/0063042 A1* | 3/2013 | Bora et al. | 315/292 |
| 2013/0063047 A1* | 3/2013 | Veskovic | 315/307 |
| 2013/0257292 A1 | 10/2013 | Verfuerth et al. | |
| 2013/0293112 A1 | 11/2013 | Reed et al. | |
| 2014/0001952 A1 | 1/2014 | Harris et al. | |
| 2014/0001959 A1 | 1/2014 | Motley et al. | |
| 2014/0001962 A1 | 1/2014 | Harris | |
| 2014/0001963 A1 | 1/2014 | Chobot et al. | |
| 2015/0305122 A1 | 10/2015 | Saes et al. | |

FOREIGN PATENT DOCUMENTS

| | | |
|---|---|---|
| JP | 2003178889 A | 6/2003 |
| JP | 2010050069 A | 3/2010 |
| JP | 2011023306 A | 2/2011 |
| JP | 2012226993 A | 11/2012 |
| KR | 20110001782 A | 1/2011 |
| KR | 20110095510 A | 8/2011 |
| WO | 2009011898 A2 | 1/2009 |
| WO | 2009145747 A1 | 12/2009 |
| WO | 2011070058 A2 | 6/2011 |
| WO | 2011087681 A1 | 7/2011 |

OTHER PUBLICATIONS

Harris, Michael, "Lighting Component with Independent DC-DC Converters", U.S. Appl. No. 13/606,713, filed Sep. 7, 2012, 42 pages.

Kuhn, Fabian et al., "Initializing Newly Deployed Ad Hoc & Sensor Network", The Tenth Annual International Conference on Mobile Computing and Networking (MobiCom '04), Sep. 26-Oct. 4, 2004, 15 pages, Philadelphia, PA.

Randolph, David, et al., "Lighting Fixture", U.S. Appl. No. 13/649,531, filed Oct. 11, 2012, 60 pages.

Author Unknown, "Multi-Agent System", Wikipedia—the free encyclopedia, Updated Apr. 18, 2013, Retrieved May 30, 2013, http://en.wikipedia.org/wiki/multi-agent_system, 7 pages.

Technical Publications Department at Creston, "Creston Green Light Commercial Lighting Design Guide," Creston Electronics, Inc., 2013, 74 pages.

Author Unknown, "System Design Guide—Lighting Control & Design: System Overview," Lighting Control and Design, Form No. 1382.057, Accessed Aug. 9, 2013, 4 pages.

Author Unknown, "Controlling LEDs," Lutron Electronics Co., Inc., Jan. 1, 2011, 16 pages.

Author Unknown, "System Overview & Introduction," nLight Network Lighting Controls, Accessed: Aug. 9, 2013, 4 pages, http://nlightcontrols.com/lighting-controls/overview.

Author Unknown, "The System: Components," Simply5, Accessed: Aug. 9, 2013, 2 pages, http://simply5.net/how.html.

Author Unknown, "Section 16950: Distributed Digital Lighting Control System," Lighting Control Devices, Apr. 30, 2013, 20 pages.

Non-Final Office Action for U.S. Appl. No. 13/782,096, dated Jun. 10, 2013, 12 pages.

Non-Final Office Action for U.S. Appl. No. 13/782,040, dated Feb. 11, 2014, 10 pages.

Final Office Action for U.S. Appl. No. 13/782,040, dated Oct. 18, 2013, 16 pages.

Final Office Action for U.S. Appl. No. 13/782,096, dated Nov. 18, 2013, 15 pages.

International Search Report and Written Opinion for PCT/US2013/047608, dated Sep. 25, 2013, 11 pages.

International Search Report and Written Opinion for PCT/US2013/047602, dated Oct. 11, 2013, 13 pages.

Notice of Allowance for U.S. Appl. No. 13/782,040 dated Jul. 23, 2014, 8 pages.

Examiner's Answer to the Appeal Brief for U.S. Appl. No. 13/782,096, mailed Jul. 7, 2014, 17 pages.

Non-Final Office Action for U.S. Appl. No. 13/589,899, dated Apr. 2, 2014, 15 pages.

International Search Report and Written Opinion for PCT/US2013/075729, dated Apr. 29, 2014, 8 pages.

International Search Report and Written Opinion for PCT/US2013/075754, dated May 15, 2014, 8 pages.

International Preliminary Report on Patentability for PCT/US2013/047602, dated Jan. 15, 2015, 10 pages.

Notice of Allowance for U.S. Appl. No. 13/782,040 dated Nov. 17, 2014, 8 pages.

First Office Action for Chinese Patent Application No. 201380045126.4, dated Feb. 1, 2016, 20 pages.

Advisory Action for U.S. Appl. No. 13/589,899, dated Feb. 11, 2016, 3 pages.

Final Office Action for U.S. Appl. No. 13/589,899, dated Nov. 6, 2015, 12 pages.

Decision on Appeal for U.S. Appl. No. 13/782,096, mailed Jul. 8, 2016, 14 pages.

Non-Final Office Action for U.S. Appl. No. 13/589,899, dated May 5, 2016, 11 pages.

First Office Action for Chinese Patent Application No. 201380045273.1, dated Mar. 17, 2016, 27 pages.

First Office Action for Chinese Patent Application No. 201380073247.X, dated May 17, 2016, 18 pages.

Examination Report for European Patent Application No. 13814810.1, dated May 24, 2016, 4 pages.

Examination Report for European Patent Application No. 13821550.4, dated May 2, 2016, 4 pages.

Notice of Allowance for U.S. Appl. No. 13/782,096, dated Sep. 26, 2016, 10 pages.

Examination Report for European Patent Application No. 13814810.1, dated Oct. 14, 2016, 4 pages.

(56) References Cited

OTHER PUBLICATIONS

Third Office Action for Chinese Patent Application No. 201380073247.X, dated Apr. 6, 2017, 14 pages.
Final Office Action for U.S. Appl. No. 13/589,899, dated May 8, 2017, 13 pages.
Second Office Action for Chinese Patent Application No. 201380045273.1, dated Jan. 17, 2017, 4 pages.
Examination Report for European Patent Application No. 13814810.1, dated Mar. 31, 2017, 6 pages.
Examination Report for European Patent Application No.13821550.4, dated Feb. 13, 2017, 5 pages.
Examination Report for European Patent Application No. 13735151.6, dated Oct. 6, 2017, 8 pages.
Examination Report for European Patent Application No. 13733525.3, dated Oct. 6, 2017, 9 pages.
Fourth Office Action for Chinese Patent Application No. 201380073247.X, dated Sep. 5, 2017, 14 pages.
Notice of Reasons for Rejection for Japanese Patent Application No. 2015-549574, dated Aug. 22, 2017, 8 pages.
First Office Action for Chinese Patent Application No. 201380066640.6, dated Jul. 20, 2017, 25 pages.
Office Action for Japanese Patent Application No. 2015-549574, dated Dec. 19, 2017, 6 pages.
Notice of Allowance for Korean Patent Application No. 10-2015-7019152, dated Dec. 26, 2017, 2 pages (no translation).
Examination Report for European Patent Application No. 13821550.4, dated Oct. 16, 2017, 4 pages.
Non-Final Office Action for U.S. Appl. No. 13/589,899, dated Oct. 6, 2017, 14 pages.
Notice of Allowance for U.S. Appl. No. 15/783,505, dated Feb. 15, 2019, 8 pages.
Advisory Action and Examiner-Initiated Interview Summary for U.S. Appl. No. 13/589,899, dated Aug. 10, 2017, 4 pages.
Notice of Allowance for U.S. Appl. No. 15/416,764, dated Jun. 6, 2017, 11 pages.
Office Action for Japanese Patent Application No. 2018-080788, dated Jan. 29, 2019, 17 pages.
Non-Final Office Action for U.S. Appl. No. 13/589,899, dated Nov. 2, 2016, 13 pages.
Ex Parte Quayle Action for U.S. Appl. No. 15/783,505, mailed Oct. 15, 2018, 6 pages.
Notice of Allowance for U.S. Appl. No. 15/928,315, dated Jan. 11, 2019, 8 pages.
Final Office Action for U.S. Appl. No. 13/589,899, dated May 4, 2018, 15 pages.
Non-Final Office Action for U.S. Appl. No. 15/714,350, dated Apr. 12, 2018, 7 pages.
Decision to Grant a Patent for Japanese Patent Application No. 2015-549574, dated Jun. 26, 2018, 4 pages.
Examination Report for European Patent Application No. 13814810.1, dated Jul. 20, 2017, 5 pages.
Notice of Preliminary Rejection for Korean Patent Application No. 10-2015-7019152, dated Jul. 18, 2017, 10 pages.
Examination Report for European Patent Application No. 13821550.4, dated Jun. 6, 2017, 5 pages.
Examination Report for European Patent Application No. 13821550.4, dated May 14, 2018, 5 pages.
Second Office Action for Chinese Patent Application No. 201380073247.X, dated Dec. 21, 2016, 14 pages.
Notice of Allowance for U.S. Appl. No. 13/589,899, dated Jul. 26, 2018, 7 pages.
Notice of Allowance for U.S. Appl. No. 15/714,350, dated Aug. 15, 2018, 9 pages.
Non-Final Office Action for U.S. Appl. No. 15/928,315, dated Sep. 10, 2018, 10 pages.
Non-Final Office Action for U.S. Appl. No. 13/589,899, dated Apr. 20, 2015, 12 pages.
International Preliminary Report on Patentability for PCT/US2013/075729, dated Jul. 2, 2015, 6 pages.
International Preliminary Report on Patentability for PCT/US2013/075754, dated Jul. 2, 2015, 5 pages.
Examination Report for European Patent Application No. 13735151.6, dated Jun. 17, 2019, 5 pages.
Examination Report for European Patent Application No. 13733525.3, dated Jun. 17, 2019, 7 pages.
Ex Parte Quayle Action for U.S. Appl. No. 16/378,647, dated Aug. 7, 2019, 6 pages.
Decision of Rejection for Japanese Patent Application No. 2018-080788, dated Aug. 27, 2019, 10 pages.

* cited by examiner

BOTTOM VIEW

CROSS SECTION

CROSS SECTION

MODULAR LIGHTING CONTROL

RELATED APPLICATIONS

This application claims the benefit of U.S. provisional patent application No. 61/666,920, filed Jul. 1, 2012, the disclosure of which is incorporated herein by reference in its entirety. This application is related to U.S. utility application Ser. No. 13/589,899, now U.S. Pat. No. 10,219,338, entitled MODULAR LIGHTING CONTROL, the disclosure of which is incorporated herein by reference in its entirety.

FIELD OF THE DISCLOSURE

The present disclosure relates to lighting fixtures, and in particular to a modular lighting control system.

BACKGROUND

In recent years, a movement has gained traction to replace incandescent light bulbs with lighting fixtures that employ more efficient lighting technologies as well as to replace relatively efficient fluorescent lighting fixtures with lighting technologies that produce a more pleasing, natural light. One such technology that shows tremendous promise employs light emitting diodes (LEDs). Compared with incandescent bulbs, LED-based light fixtures are much more efficient at converting electrical energy into light, are longer lasting, and are also capable of producing light that is very natural. Compared with fluorescent lighting, LED-based fixtures are also very efficient, but are capable of producing light that is much more natural and more capable of accurately rendering colors. As a result, lighting fixtures that employ LED technologies are expected to replace incandescent and fluorescent bulbs in residential, commercial, and industrial applications.

Unlike incandescent bulbs that operate by subjecting a filament to a desired current, LED-based lighting fixtures require electronics to drive one or more LEDs. The electronics generally include a power supply and a special control circuitry to provide uniquely configured signals that are required to drive the one or more LEDs in a desired fashion. The presence of the control circuitry adds a level of intelligence to the lighting fixtures that can be leveraged to employ various types of lighting control. The lighting control can be provided solely from within the fixture or from remote control systems.

Unfortunately, there is limited compatibility between available lighting fixtures and available control systems, because the companies that provide the lighting fixtures are generally not the same companies that provide the control systems that control the lighting fixtures. In many instances, the control system companies are not fully aware of the all of the available features of the lighting fixtures, and thus, many potentially valuable or desirable features of the lighting fixtures are never employed when the lighting fixtures are under the control of a different company's control system. Further, different control systems from different companies may use different communication buses and different protocols for communications. Thus, different lighting fixtures must be specifically designed to work with the different control systems, communication buses, and communication protocols. All of these variables increase the design, manufacturing, and maintenance costs of the lighting fixture companies while many features of the lighting fixtures remain under utilized.

As such, there is a need for a flexible lighting architecture that can be effectively and efficiently controlled by different lighting control systems and support a varying array of control features.

SUMMARY

The present disclosure relates to a modular lighting system that may include a driver module, an array of LEDs that are driven by the driver module, and a control module. The control module is configured to control the driver module, which in turn drives the LEDs of the array of LEDs in a desired fashion. The control module may communicate with one or more remote lighting control systems through wired or wireless communications and function to control the driver module accordingly. Notably, the driver module and the control module communicate with each other through a first communication protocol, such that either of the driver module or the control module can be replaced without replacing the other of the driver module or control module. The control module may be configured to convert messages from the first communication protocol used to communicate with the driver module and a second protocol used to communicate with the remote lighting control systems. Further, power may be provided to the control module and the array of LEDs by the driver module via the standard communication interface or separate power interface.

The present disclosure further relates to a modular lighting system that may include a driver module, an array of LEDs that are driven by the driver module, and one or more auxiliary modules. The auxiliary modules are configured to control the driver module, which in turn drives the LEDs of the array of LEDs in a desired fashion. The auxiliary module may provide a bridge for communications with one or more remote lighting control systems through wired or wireless communications and function to control the driver module accordingly. Other exemplary auxiliary modules may include modules that function to control the driver module based on one or more of ambient light, ambient temperature, room occupancy, emergency lighting requirements, and the like.

Notably, the driver module and the auxiliary modules communicate with each other through a first communication protocol, such that modules can readily be added to an existing lighting system and any of the modules can be replaced without replacing any of the other modules. A bridge module may be configured to convert messages from the first communication protocol used to communicate with the driver module and the other auxiliary modules and a second protocol used to communicate with remote lighting control systems. Any of the auxiliary or bridge modules may be used to control one or more driver modules in various lighting system configurations. Further, power may be provided to the control module and the array of LEDs by the driver module via the standard communication interface or separate power interface.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that relative terms such as "front," "forward," "rear," "below," "above," "upper," "lower," "horizontal," or "vertical" may be used herein to describe a relationship of one element, layer or region to another element, layer or region as illustrated in the figures. It will be understood that these terms are intended to encompass different orientations of the device in addition to the orientation depicted in the figures.

The present disclosure relates to a modular lighting system that may include a driver module, an array of LEDs that are driven by the driver module, and a control module. The control module is configured to control the driver module, which in turn drives the LEDs of the array of LEDs in a desired fashion. The control module may communicate with one or more remote lighting control systems through wired or wireless communications and function to control the driver module accordingly. Notably, the driver module and the control module communicate with each other through a first communication protocol, such that either of the driver module or the control module can be replaced without replacing the other of the driver module or control module. The control module may be configured to convert messages from the first communication protocol used to communicate with the driver module and a second protocol used to communicate with the remote lighting control systems. Further, power may be provided to the control module and the array of LEDs by the driver module via the standard communication interface or separate power interface.

Figure 1:
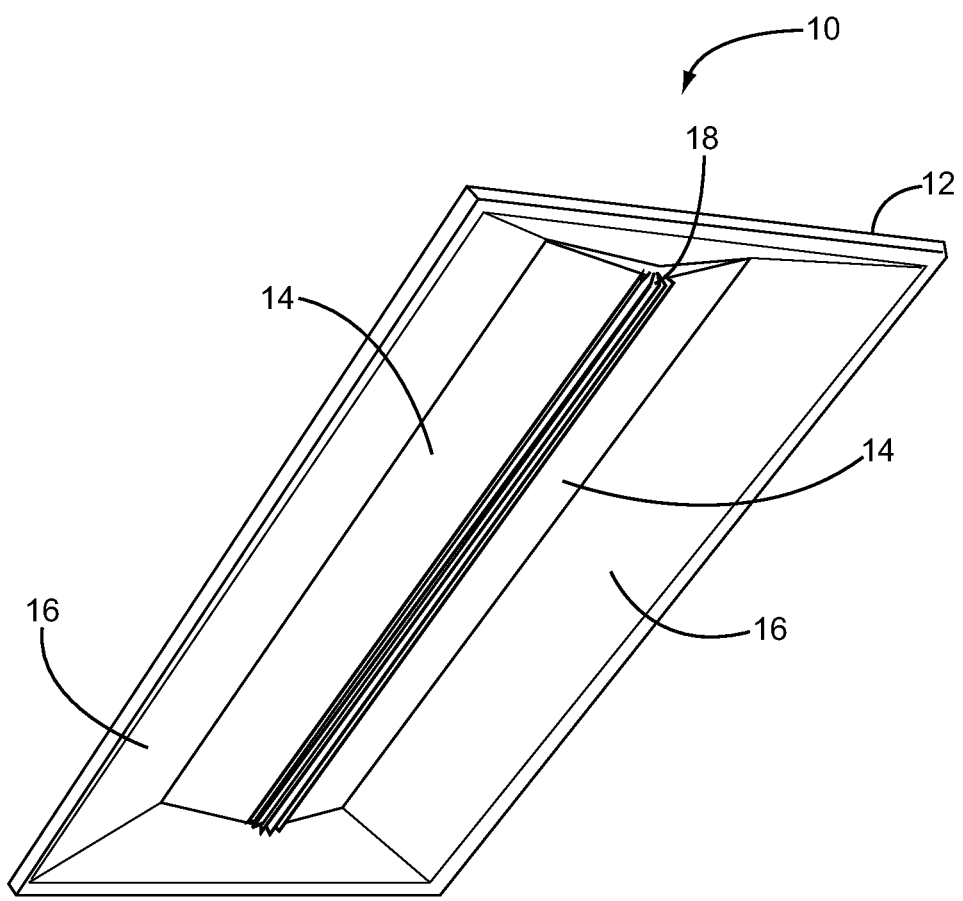
FIG. 1 is a perspective view of a troffer-based lighting fixture according to one embodiment of the disclosure.
Figure 2:
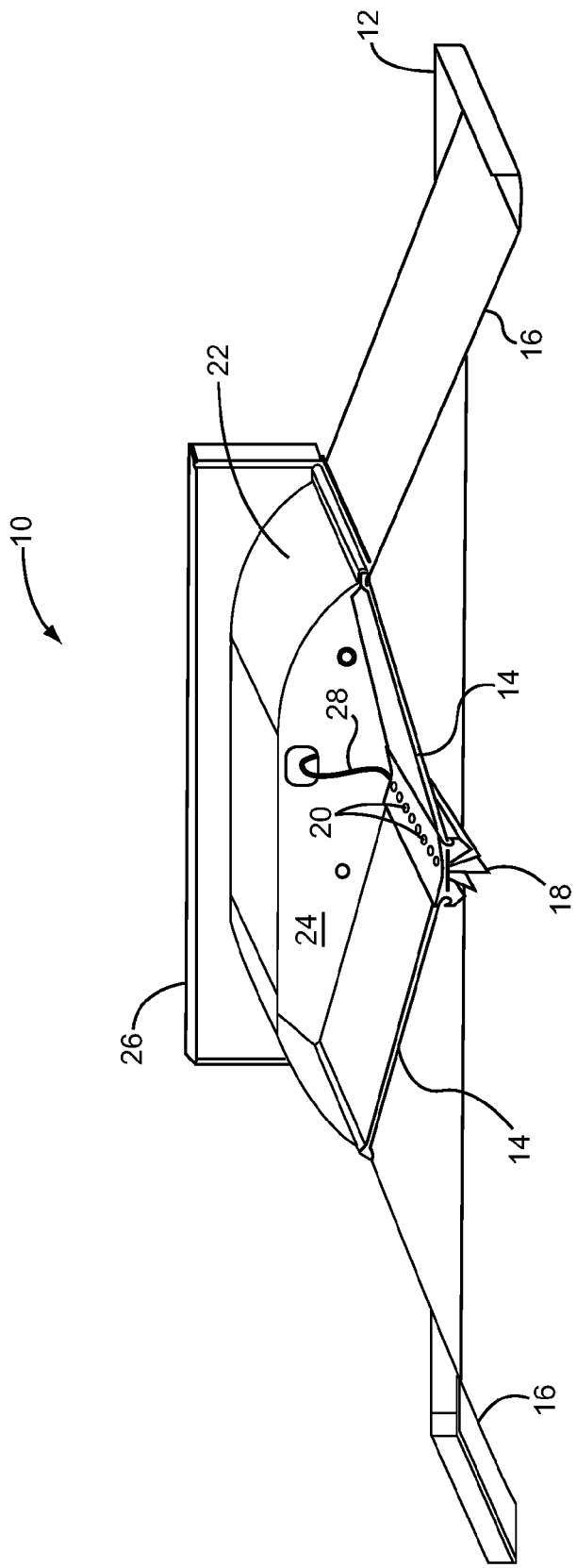
FIG. 2 is a cross section of the lighting fixture of FIG. 1.
Figure 3:
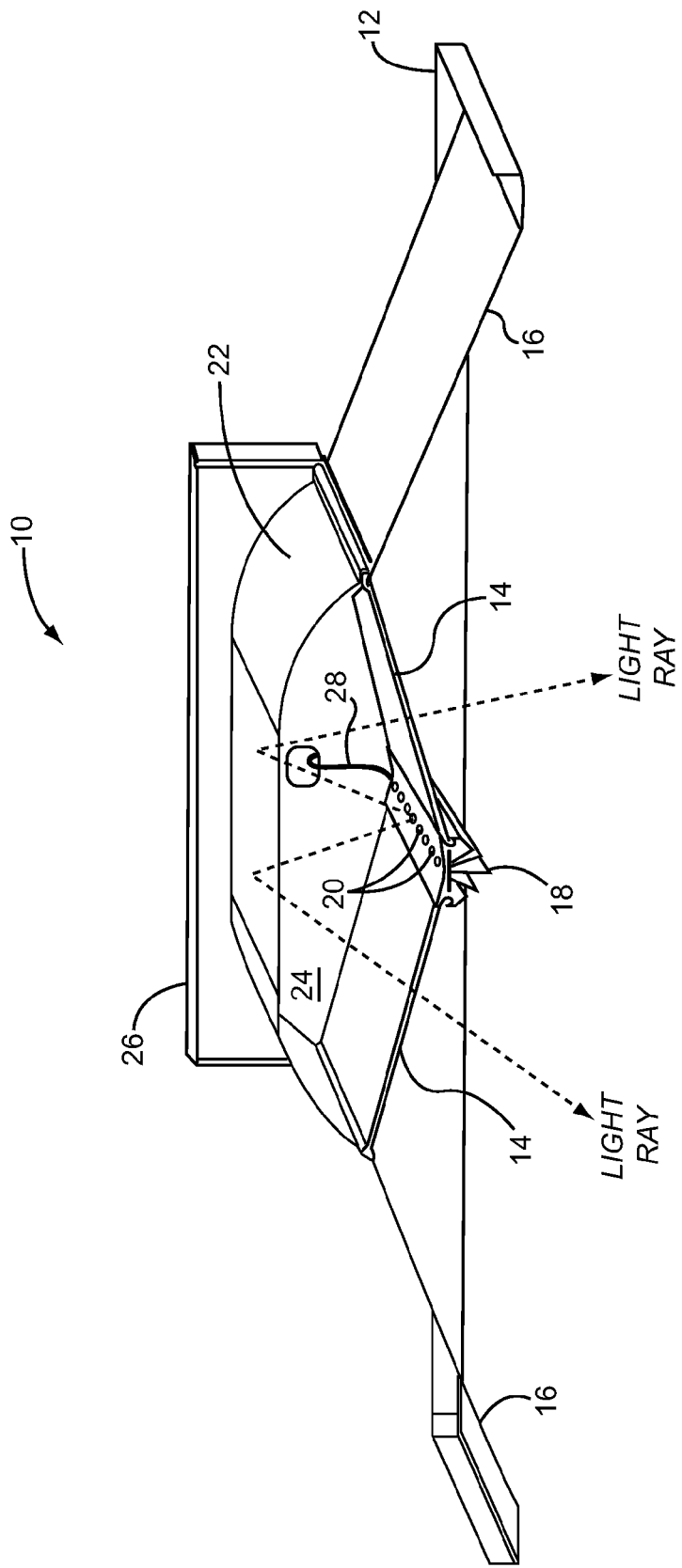
FIG. 3 is a cross section of the lighting fixture of FIG. 1 illustrating how light emanates from the LEDs of the lighting fixture and is reflected out through lenses of the lighting fixture.

Prior to delving into the details of the present disclosure, an overview of a lighting fixture in which the modular lighting system may be employed is described. While the concepts of the present disclosure may be employed in any type of lighting system, the following description describes these concepts in a troffer-type lighting fixture, such as the lighting fixture 10 illustrated in FIGS. 1-3. In general, troffer-type lighting fixtures, such as the lighting fixture 10, are designed to mount in a ceiling. In most applications, the troffer-type lighting fixtures are mounted into a drop ceiling (not shown). As illustrated in FIGS. 1-3, the lighting fixture 10 includes a rectangular outer frame 12. In the central portion of the lighting fixture 10 are two rectangular lenses 14, which are generally transparent, translucent, or opaque. Reflectors 16 extend from the outer frame 12 to the outer edges of the lenses 14. The lenses 14 effectively extend between the innermost portions of the reflectors 16 to an elongated heat sink 18, which functions to join the two inside edges of the lenses 14.

Turning now to FIGS. 2 and 3 in particular, the back side of the heatsink 18 provides a mounting structure for an LED array 20, which includes one or more rows of individual LEDs mounted on an appropriate substrate. The LEDs are oriented to primarily emit light upwards toward a concave cover 22. The volume bounded by the cover 22, the lenses 14, and the back of the heatsink 18 provides a mixing chamber 24. As such, light will emanate upwards from the LEDs of the LED array 20 toward the cover 22 and will be reflected downward through the respective lenses 14, as illustrated in FIG. 3. Notably, not all light rays emitted from the LEDs will reflect directly off of the bottom of the cover 22 and back through a particular lens 14 with a single reflection. Many of the light rays will bounce around within the mixing chamber 24 and effectively mix with other light rays, such that a desirably uniform light is emitted through the respective lenses 14.

Those skilled in the art will recognize that the type of lenses 14, the type of LEDs, the shape of the cover 22, and any coating on the bottom side of the cover 22, among many other variables, will affect the quantity and quality of light emitted by the lighting fixture 10. As will be discussed in greater detail below, the LED array 20 may include LEDs of different colors, wherein the light emitted from the various LEDs mixes together to form a white light having a desired color temperature and quality based on the design parameters for the particular embodiment.

As is apparent from FIGS. 2 and 3, the elongated fins of the heatsink 18 may be visible from the bottom of the lighting fixture 10. Placing the LEDs of the LED array 20 in thermal contact along the upper side of the heatsink 18 allows any heat generated by the LEDs to be effectively transferred to the elongated fins on the bottom side of the heatsink 18 for dissipation within the room in which the lighting fixture 10 is mounted. Again, the particular configuration of the lighting fixture 10 illustrated in FIGS. 1-3 is merely one of the virtually limitless configurations for lighting fixtures 10 in which the concepts of the present disclosure are applicable.

Figure 4:
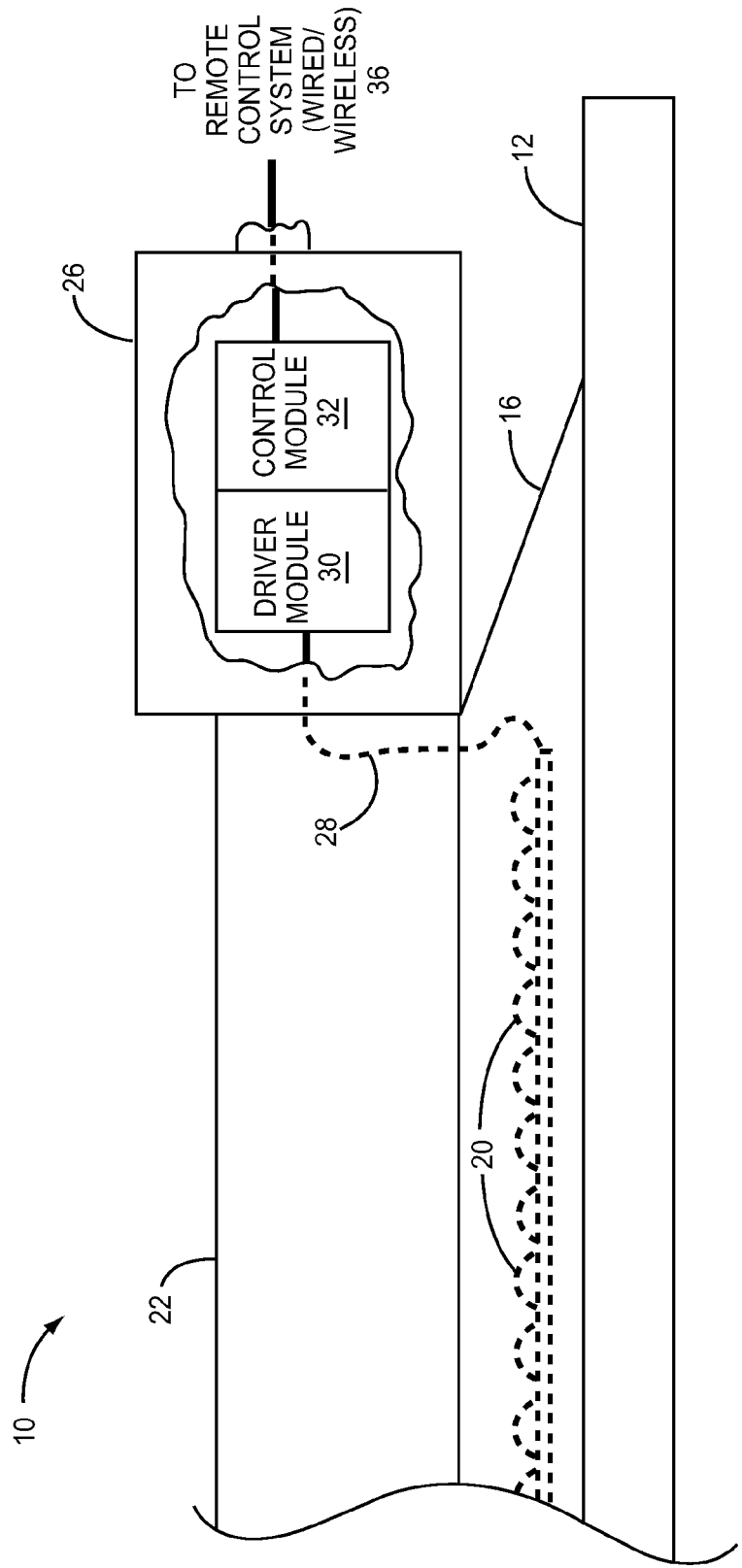
FIG. 4 illustrates a driver module and a control module integrated within an electronics housing of the lighting fixture of FIG. 1.

With continued reference to FIGS. 2 and 3, an electronics housing 26 is shown mounted at one end of the lighting fixture 10, and is used to house all or a portion of the electronics used to power and control the LED array 20. These electronics are coupled to the LED array 20 through appropriate cabling 28. With reference to FIG. 4, the electronics provided in the electronics housing 26 may be divided into a driver module 30 and a control module 32.

At a high level, the driver module 30 is coupled to the LED array 20 through the cabling 28 and directly drives the LEDs of the LED array 20 based on control information provided by the control module 32. The control module 32 provides the intelligence for the lighting fixture 10 and is capable of instructing the driver module 30 in a manner sufficient to drive the LEDs of the LED array 20 in a desired fashion. The control module 32 may also be configured to communicate with a remote control system 36 in a wired or wireless fashion.

In the embodiment of FIG. 4, the control module 32 may be implemented on a separate printed circuit board (PCB) than the driver module 30. The respective PCBs of the driver module 30 and the control module 32 may be configured to allow the connector of the control module 32 to plug into the connector of the driver module 30, wherein the control module 32 is mechanically mounted, or affixed, to the driver module 30 once the connector of the control module 32 is plugged into the mating connector of the driver module 30.

In other embodiments, a cable may be used to connect the respective connectors of the driver module 30 and the control module 32, other attachment mechanisms may be used to physically couple the control module 32 to the driver module 30, or the driver module 30 and the control module 32 may be separately affixed to the inside of the electronics housing 26. In such embodiments, the interior of the electronics housing 26 is sized appropriately to accommodate both the driver module 30 and the control module 32. In many instances, the electronics housing 26 provides a plenum rated enclosure for both the driver module 30 and the control module 32.

Figure 5:
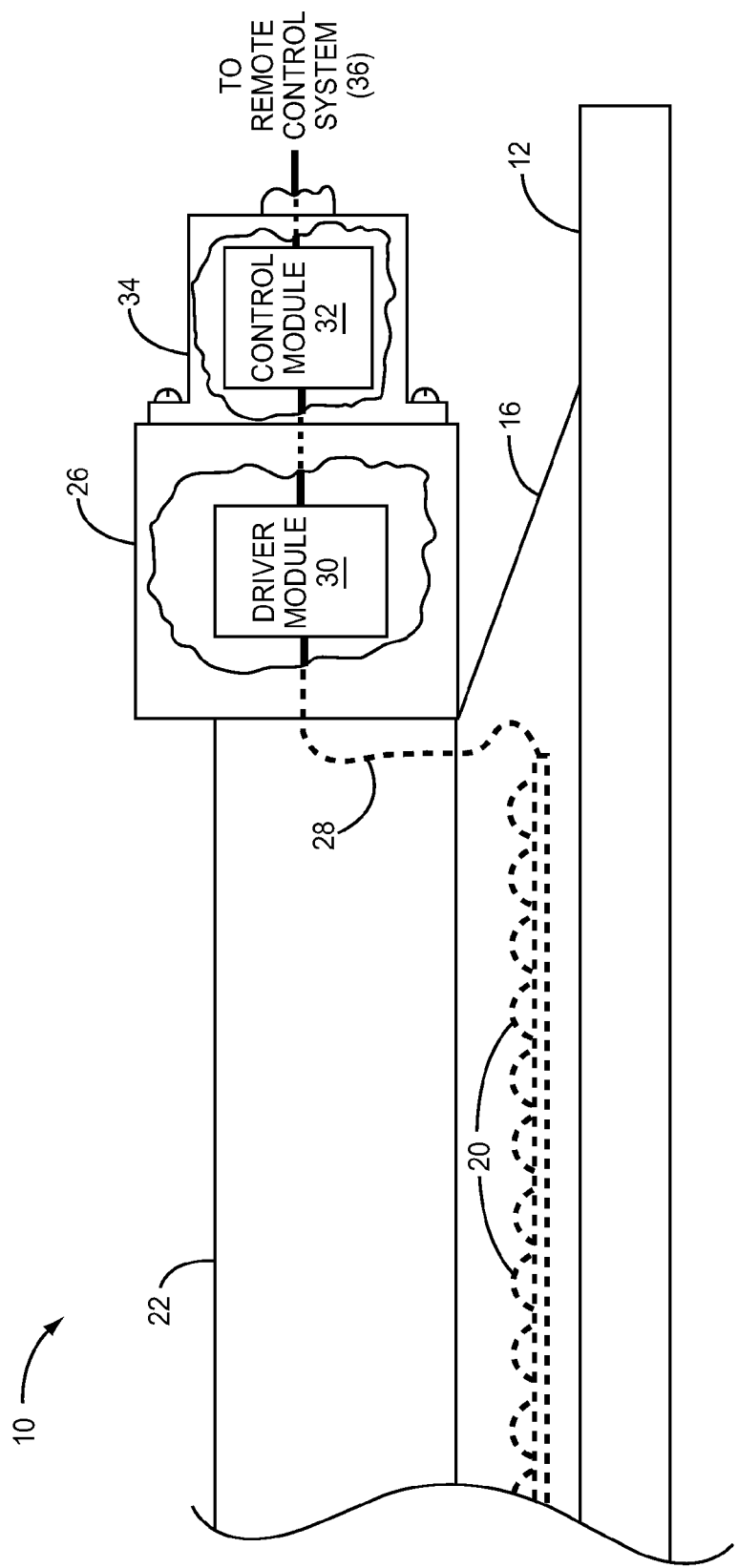
FIG. 5 illustrates a driver module provided in an electronics housing of the lighting fixture of FIG. 1 and a control module in an associated housing coupled to the exterior of the electronics housing according to one embodiment of the disclosure.

With the embodiment of FIG. 4, adding or replacing the control module 32 requires gaining access to the interior of the electronics housing 26. If this is undesirable, the driver module 30 may be provided alone in the electronics housing 26. The control module 32 may be mounted outside of the electronics housing 26 in an exposed fashion or within a supplemental housing 34, which may be directly or indirectly coupled to the outside of the electronics housing 26, as shown in FIG. 5. The supplemental housing 34 may be bolted to the electronics housing 26. The supplemental housing 34 may alternatively be connected to the electronics housing snap-fit or hook-and-snap mechanisms. The supplemental housing 34, alone or when coupled to the exterior surface of the electronics housing 26, may provide a plenum rated enclosure.

In embodiments where the electronics housing 26 and the supplemental housing 34 will be mounted within a plenum rated enclosure, the supplemental housing 34 may not need to be plenum rated. Further, the control module 32 may be directly mounted to the exterior of the electronics housing 26 without any need for a supplemental housing 34, depending on the nature of the electronics provided in the control module 32, how and where the lighting fixture 10 will be mounted, and the like. The latter embodiment wherein the control module 32 is mounted outside of the electronics housing 26 may prove beneficial when the control module 32 facilitates wireless communications with the remote control system 36 or other network or auxiliary device. In essence, the driver module 30 may be provided in the plenum rated electronics housing 26, which may not be conducive to wireless communications. The control module 32 may be mounted outside of the electronics housing 26 by itself or within the supplemental housing 34 that is more conducive to wireless communications. A cable may be provided between the driver module 30 and the control module 32 according to a standard communication interface, which is described in more detail below.

The embodiments that employ mounting the control module 32 outside of the electronics housing 26 may be somewhat less cost effective, but provide significant flexibility in allowing the control module 32 or other auxiliary devices to be added to the lighting fixture 10, serviced, or replaced. The supplemental housing 34 for the control module 32 may be made of a plenum rated plastic or metal, and may be configured to readily mount to the electronics housing 26 through snaps, screws, bolts, or the like, as well as receive the control module 32. The control module 32 may be mounted to the inside of the supplemental housing 34 through snap-fits, screws, twistlocks, and the like. The cabling and connectors used for connecting the control module 32 to the driver module 30 may take any available form, such as with standard category 5 (cat 5) cable having RJ45 connectors, edge card connectors, blind mate connector pairs, terminal blocks and individual wires, and the like. Having an externally mounted control module 32 relative to the electronics housing 26 that includes the driver module 30 allows for easy field installation of different types of control modules 32 for a given driver module 30. As illustrated below, different control modules 32 may be configured to provide different operation or capability sets.

Figure 6:
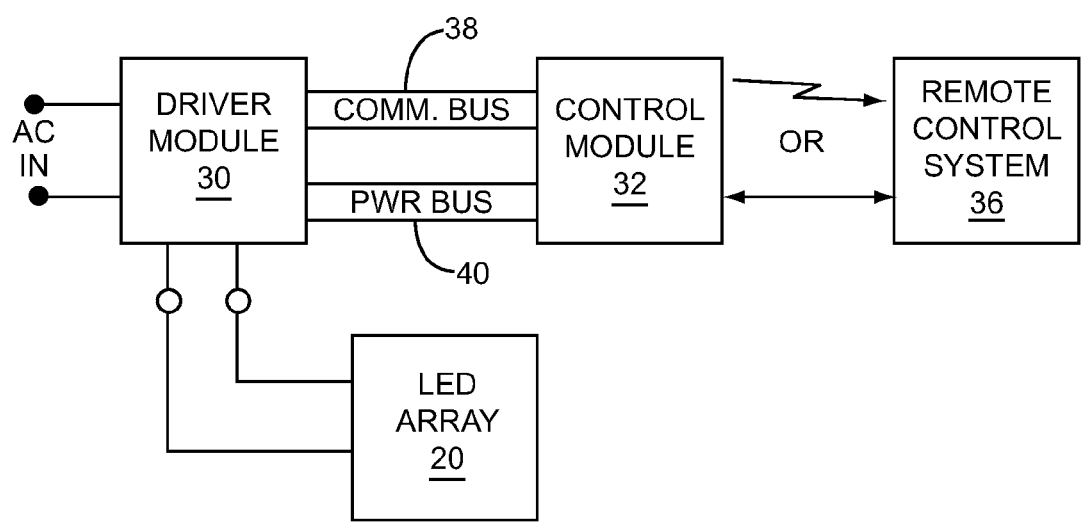
FIG. 6 is a block diagram of a lighting system according to one embodiment of the disclosure.

Turning now to FIG. 6, a block diagram of a lighting system is provided according to one embodiment. Assume for purposes of discussion that the driver module 30, control module 32, and LED array 20 are ultimately connected to form the core of the lighting fixture 10, and that the control module 32 is configured to bidirectionally communicate with a remote control system 36 through wired or wireless techniques. At the core of this embodiment resides a standard communication interface and the use of a first, or standard, protocol between the driver module 30 and the control module 32. This standard protocol allows different driver modules 30 to communicate with and be controlled by different control modules 32, assuming that both the driver module 30 and the control module 32 are operating according to the standard protocol used by the standard communication interface. The term "standard protocol" is defined to mean any type of known or future developed, proprietary or industry standardized protocol that is used for communications between the driver module 30, the control module 32, and any other auxiliary module 90, such as those illustrated in FIGS. 13-15, which are described in further detail below.

In the illustrated embodiment, the driver module 30 and the control module 32 are coupled via a communication (COMM) bus 38 and a power (PWR) bus 40. The communication bus 38 allows the control module 32 to receive information from the driver module 30 as well as control the driver module 30. An exemplary communication bus 38 is the well-known inter-integrated circuitry ($I^2C$) bus, which is a serial bus and is typically implemented with a two-wire interface employing data and clock lines. Other available buses include: serial peripheral interface (SPI) bus, Dallas Semiconductor Corporation's 1-Wire serial bus, universal serial bus (USB), RS-232, Microchip Technology Incorporated's UNI/O®, and the like.

The driver module 30 is configured to drive the LEDs of the LED array 20 based on the control information provided by the control module 32. The control module 32 may collect data about the configuration or operation of the driver module 30 and any information made available to the driver module 30 by the LED array 20. The collected data may be used by the control module 32 to determine how the driver module 30 is controlled. The collected data may also be passed to the remote control system 36. The control module 32 itself may be controlled by the remote control system 36, such that commands to turn on, dim, or otherwise control the LED array 20 are originated by the remote control system 36 and passed to the control module 32. The control module 32 will process the instructions provided by the remote control system 36 and then provide instructions over the communication bus 38 to the driver module 30, which will respond by controlling the drive current or voltages provided to the LED array 20 as appropriate. An exemplary command set for a hypothetical protocol is provided below.

Exemplary Command Set

| Command | Source | Receiver | Description |
|---|---|---|---|
| On/Off | Control Module | Driver Module | On/Off |
| Color Temperature | Control Module | Driver Module | Color temperature of solid state light |
| Dimming Level | Control Module | Driver Module | Set light level |
| Fixture ID | Driver Module | Control Module | Solid State light id |
| Health | Driver Module | Control Module | Health of solid state light |
| Power Usage | Driver Module | Control Module | Power used by solid state light |
| Usage | Driver Module | Control Module | Hours of use |
| Lifetime | Driver Module | Control Module | Useful life (factors hours, ambient temp and power level) |
| Zone ID | Driver Module | Control Module | Identifies the zone the fixture is in |
| Temperature | Driver Module | Control Module | Solid State temperature level (protection) |
| Emergency Enabled | Driver Module | Control Module | Indentifies the fixture as an emergency enabled fixture. |
| Emergency Health | Driver Module | Control Module | Battery State |
| Emergency Test | Control Module | Driver Module | Remote method to allow testing of emergency solid state fixture |
| Emergency Pass | Driver Module | Control Module | Pass indication for emergency test |

The above table has four columns: command, source, receiver, and description. The command represents the actual instruction passed either from the control module 32 to the driver module 30 or from the driver module 30 to the control module 32. The source identifies the sender of the command. The receiver identifies the intended recipient of the command. The communication column provides a description of the command. For example, the "on/off" command is sent by the control module 32 to the driver module 30 and effectively allows the control module 32 to instruct the driver module 30 to either turn on or turn off the LED array 20. The "color temperature" command allows the control module 32 to instruct the driver module 30 to drive the LED array 20 in a manner to generate a desired color temperature. The "color temperature" command may actually include the desired color temperature or a reference to available color temperature.

The "dimming level" command is sent from the control module 32 to the driver module 30 to set an overall light level based on a desired level of dimming. The "fixture ID" command allows the driver module 30 to identify itself to the control module 32. The "health" command allows the driver module 30 to send the control module 32 information relative to its operational capability or, in other words, health. The "power usage" command allows the driver module 30 to tell the control module 32 how much power is being used by the driver module 30 on average or at any given time, depending on the capabilities of the driver module 30. The "usage" command allows the driver module 30 to identify the total hours of use, hours of consistent use, or the like to the control module 32. The "lifetime" command allows the driver module 30 to provide an estimate of the useful remaining life of the driver module 30, the LED array 20, or a combination thereof to the control module 32. Based on the capabilities of the driver module 30, the amount of remaining life may factor in past usage, ambient temperatures, power levels, or the like.

The "zone ID" command allows the driver module 30 to tell the control module 32 in which zone the driver module 30 resides. This command is useful when the remote control system 36 is controlling multiple lighting fixtures and is collecting information about the zones in which the lighting fixtures 10 reside. The "temperature" command allows the driver module 30 to provide ambient temperature information for the driver module 30 or the LED array 20 to the control module 32.

The "emergency enabled" command allows the driver module 30 to tell the control module 32 that the lighting fixture 10 is an emergency enabled fixture, which can be used for emergency lighting. The "emergency health" command allows the driver module 30 to provide information bearing on the ability of the driver module 30 or the lighting fixture 10 to function as an emergency lighting fixture. In a simple embodiment, the command may provide the state of an emergency backup battery that has been made available to drive the lighting fixture 10 in case of an emergency. The "emergency test" command allows the control module 32 to send an instruction to the driver module 30 to run an emergency lighting test to ensure that the lighting fixture 10 can operate in an emergency lighting mode, if so required. The "emergency pass" command allows the driver module 30 to inform the control module 32 that the emergency test was passed (or failed). The above commands primarily describe the direction of information flow. However, the protocol may allow the control module 32 or the driver module 30 to selectively or periodically request any of this or other information specifically or in batches.

The use of a standard communication interface and a standard protocol for communications between the driver module 30 and the control module 32 supports a modular approach for the driver module 30 and the control module 32. For example, different manufacturers may make different control modules 32 that interface with a particular driver module 30. The different control modules 32 may be configured to drive the driver module 30 differently based on different lighting applications, available features, price points, and the like. As such, the control module 32 may be configured to control different types of driver modules 30. Once a control module 32 is coupled to a driver module 30, the control module 32 identifies the type of driver module 30 and will control the driver module 30 accordingly. Further, a driver module 30 may be able to operate over various ranges for different lighting parameters. Different control modules 32 may be configured to control these parameters to varying degrees. The first control module 32 may only be given access to a limited parameter set, wherein another control module 32 may be given access to a much greater parameter set. The table below provides an exemplary parameter set for a given driver module 30.
Parameters

| | |
|---|---|
| PWM dimming Frequency | 200 Hz through 1000 Hz |
| Maximum Light Level | 50% to 100% |
| Color Temperature | 2700K to 6000K |
| Maximum allowable hours | 50,000 to 100,000 |
| Minimum dimming level | 0 to 50% |
| Response time | 100 ms to 1 sec |
| Color temperature settable | 0 or 1 |
| Dimming curve | Linear, exponential. Dim to warmer or cooler color temperature |
| Alarm Indication | 0 or 1 |

The parameters in the above table may represent the available control points for a given driver module 30. A given parameter set may be assigned to the driver module 30 during manufacture or may be set by the control module 32 during installation of the lighting fixture 10 or upon associating the control module 32 with the driver module 30. The parameter set includes various parameters, such as the pulse width modulation (PWM) dimming frequency, maximum light level, and color temperature. The parameter set represents the allowable ranges for each of these parameters. Each parameter may be set within the identified range in the parameter set during operation or the like by the control module 32 or the remote control system 36, depending on the desires of the designer or the particular application.

As an example, the maximum light level for the exemplary parameter set indicates it can be set from anywhere from 50% to 100% of the capabilities of the driver module 30 and the associated LED array 20. If the end user or owner of the lighting system that employs the lighting fixture 10 initiates the appropriate instructions, the maximum light level may be set to 80% in an appropriate parameter field. As such, the driver module 30 would not drive the LED array 20 to exceed 80%, even if the control module 32 or the remote control system 36 subsequently provided a command to the driver module 32 to increase the lighting level above 80% of its maximum capability. These parameters may be stored in the driver module 30 or in the control module 32 in non-volatile memory.

In certain embodiments, the driver module 30 includes sufficient electronics to process an alternating current (AC) input signal (AC IN) and provide an appropriate rectified or direct current (DC) signal sufficient to power the control module 32, and perhaps the LED array 20. As such, the control module 32 does not require separate AC-to-DC conversion circuitry to power the electronics residing therein, and can simply receive DC power from the driver module 30 over the power bus 40, which may be separate from the communication bus 38 or may be integrated with the communication bus 38, as will be described below.

In one embodiment, one aspect of the standard communication interface is the definition of a standard power delivery system. For example, the power bus 40 may be set to a low voltage level, such as 5 volts, 12 volts, 24 volts, or the like. The driver module 30 is configured to process the AC input signal to provide the defined low voltage level and provide that voltage over the power bus 40, thus the control module 32 or auxiliary devices may be designed in anticipation of the desired low voltage level being provided over the power bus 40 by the driver module 30 without concern for connecting to or processing an AC signal to a DC power signal for powering the electronics of the control module 32.

Figure 7:
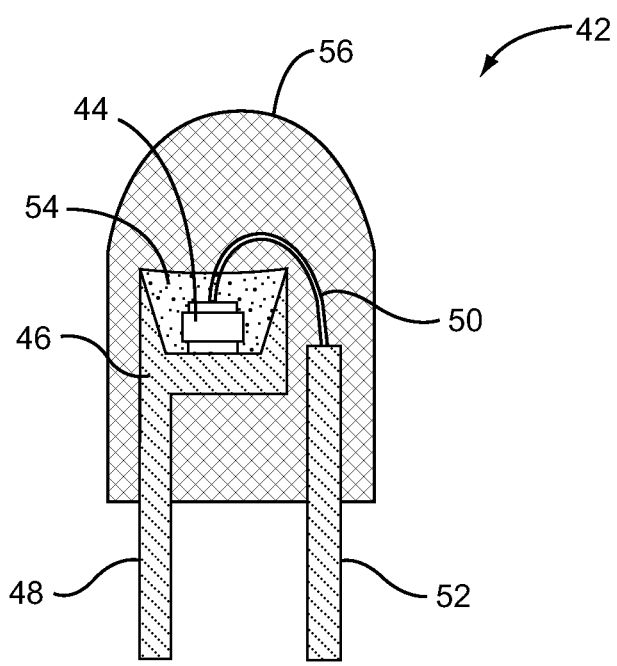
FIG. 7 is a cross section of an exemplary LED according to a first embodiment of the disclosure.

A description of an exemplary embodiment of the LED array 20, driver module 30, and the control module 32 follows. As noted, the LED array 20 includes a plurality of LEDs, such as the LEDs 42 illustrated in FIGS. 7 and 8. With reference to FIG. 7, a single LED chip 44 is mounted on a reflective cup 46 using solder or a conductive epoxy, such that ohmic contacts for the cathode (or anode) of the LED chip 44 are electrically coupled to the bottom of the reflective cup 46. The reflective cup 46 is either coupled to or integrally formed with a first lead 48 of the LED 42. One or more bond wires 50 connect ohmic contacts for the anode (or cathode) of the LED chip 44 to a second lead 52.

The reflective cup 46 may be filled with an encapsulant material 54 that encapsulates the LED chip 44. The encapsulant material 54 may be clear or contain a wavelength conversion material, such as a phosphor, which is described in greater detail below. The entire assembly is encapsulated in a clear protective resin 56, which may be molded in the shape of a lens to control the light emitted from the LED chip 44.

Figure 8:
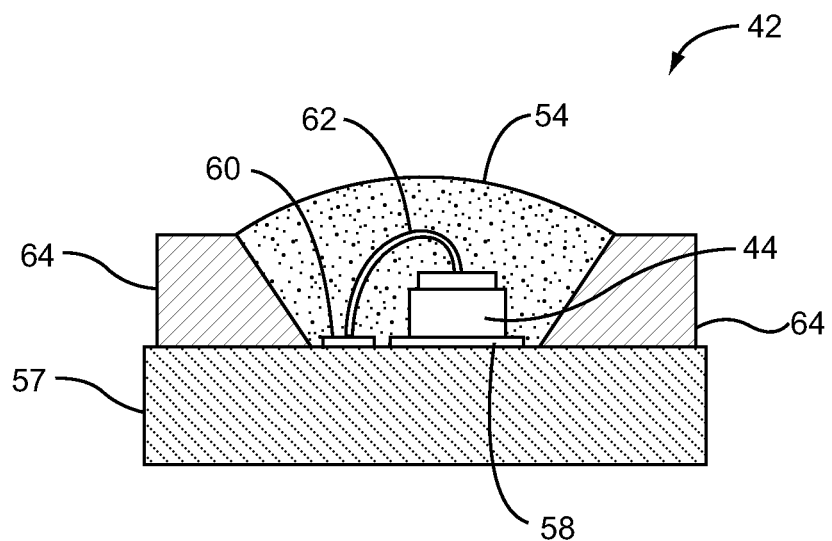
FIG. 8 is a cross section of an exemplary LED according to a second embodiment of the disclosure.

An alternative package for an LED 42 is illustrated in FIG. 8 wherein the LED chip 44 is mounted on a substrate 57. In particular, the ohmic contacts for the anode (or cathode) of the LED chip 44 are directly mounted to first contact pads 58 on the surface of the substrate 57. The ohmic contacts for the cathode (or anode) of the LED chip 44 are connected to second contact pads 60, which are also on the surface of the substrate 57, using bond wires 62. The LED chip 44 resides in a cavity of a reflector structure 64, which is formed from a reflective material and functions to reflect light emitted from the LED chip 44 through the opening formed by the reflector structure 64. The cavity formed by the reflector structure 64 may be filled with an encapsulant material 54 that encapsulates the LED chip 44. The encapsulant material 54 may be clear or contain a wavelength conversion material, such as a phosphor.

In either of the embodiments of FIGS. 7 and 8, if the encapsulant material 54 is clear, the light emitted by the LED chip 44 passes through the encapsulant material 54 and the protective resin 56 without any substantial shift in color. As such, the light emitted from the LED chip 44 is effectively the light emitted from the LED 42. If the encapsulant material 54 contains a wavelength conversion material, substantially all or a portion of the light emitted by the LED chip 44 in a first wavelength range may be absorbed by the wavelength conversion material, which will responsively emit light in a second wavelength range. The concentration and type of wavelength conversion material will dictate how much of the light emitted by the LED chip 44 is absorbed by the wavelength conversion material as well as the extent of the wavelength conversion. In embodiments where some of the light emitted by the LED chip 44 passes through the wavelength conversion material without being absorbed, the light passing through the wavelength conversion material will mix with the light emitted by the wavelength conversion material. Thus, when a wavelength conversion material is used, the light emitted from the LED 42 is shifted in color from the actual light emitted from the LED chip 44.

The LED array 20 may include a group of BSY or BSG LEDs 42 as well as a group of red LEDs 42. BSY LEDs 42 include an LED chip 44 that emits bluish light, and the wavelength conversion material is a yellow phosphor that absorbs the blue light and emits yellowish light. Even if some of the bluish light passes through the phosphor, the resultant mix of light emitted from the overall BSY LED 42 is yellowish light. The yellowish light emitted from a BSY LED 42 has a color point that falls above the Black Body Locus (BBL) on the 1931 CIE chromaticity diagram wherein the BBL corresponds to the various color temperatures of white light.

Similarly, BSG LEDs 42 include an LED chip 44 that emits bluish light; however, the wavelength conversion material is a greenish phosphor that absorbs the blue light and emits greenish light. Even if some of the bluish light passes through the phosphor, the resultant mix of light emitted from the overall BSG LED 42 is greenish light. The greenish light emitted from a BSG LED 42 has a color point that falls above the BBL on the 1931 CIE chromaticity diagram wherein the BBL corresponds to the various color temperatures of white light.

The red LEDs 42 generally emit reddish light at a color point on the opposite side of the BBL as the yellowish or greenish light of the BSY or BSG LEDs 42. As such, the reddish light from the red LEDs 42 mixes with the yellowish or greenish light emitted from the BSY or BSG LEDs 42 to generate white light that has a desired color temperature and falls within a desired proximity of the BBL. In effect, the reddish light from the red LEDs 42 pulls the yellowish or greenish light from the BSY or BSG LEDs 42 to a desired color point on or near the BBL. Notably, the red LEDs 42 may have LED chips 44 that natively emit reddish light wherein no wavelength conversion material is employed. Alternatively, the LED chips 44 may be associated with a wavelength conversion material, wherein the resultant light emitted from the wavelength conversion material and any light that is emitted from the LED chips 44 without being absorbed by the wavelength conversion material mixes to form the desired reddish light.

The blue LED chip 44 used to form either the BSY or BSG LEDs 42 may be formed from a gallium nitride (GaN), indium gallium nitride (InGaN), silicon carbide (SiC), zinc selenide (ZnSe), or like material system. The red LED chip 44 may be formed from an aluminum indium gallium nitride (AlInGaP), gallium phosphide (GaP), aluminum gallium arsenide (AlGaAs), or like material system. Exemplary yellow phosphors include cerium-doped yttrium aluminum garnet (YAG:Ce), yellow BOSE (Ba, O, Sr, Si, Eu) phosphors, and the like. Exemplary green phosphors include green BOSE phosphors, Lutetium aluminum garnet (LuAg), cerium doped LuAg (LuAg:Ce), Maui M535 from Lightscape Materials, Inc. of 201 Washington Road, Princeton, N.J. 08540, and the like. The above LED architectures, phosphors, and material systems are merely exemplary and are not intended to provide an exhaustive listing of architectures, phosphors, and materials systems that are applicable to the concepts disclosed herein.

Figure 9:
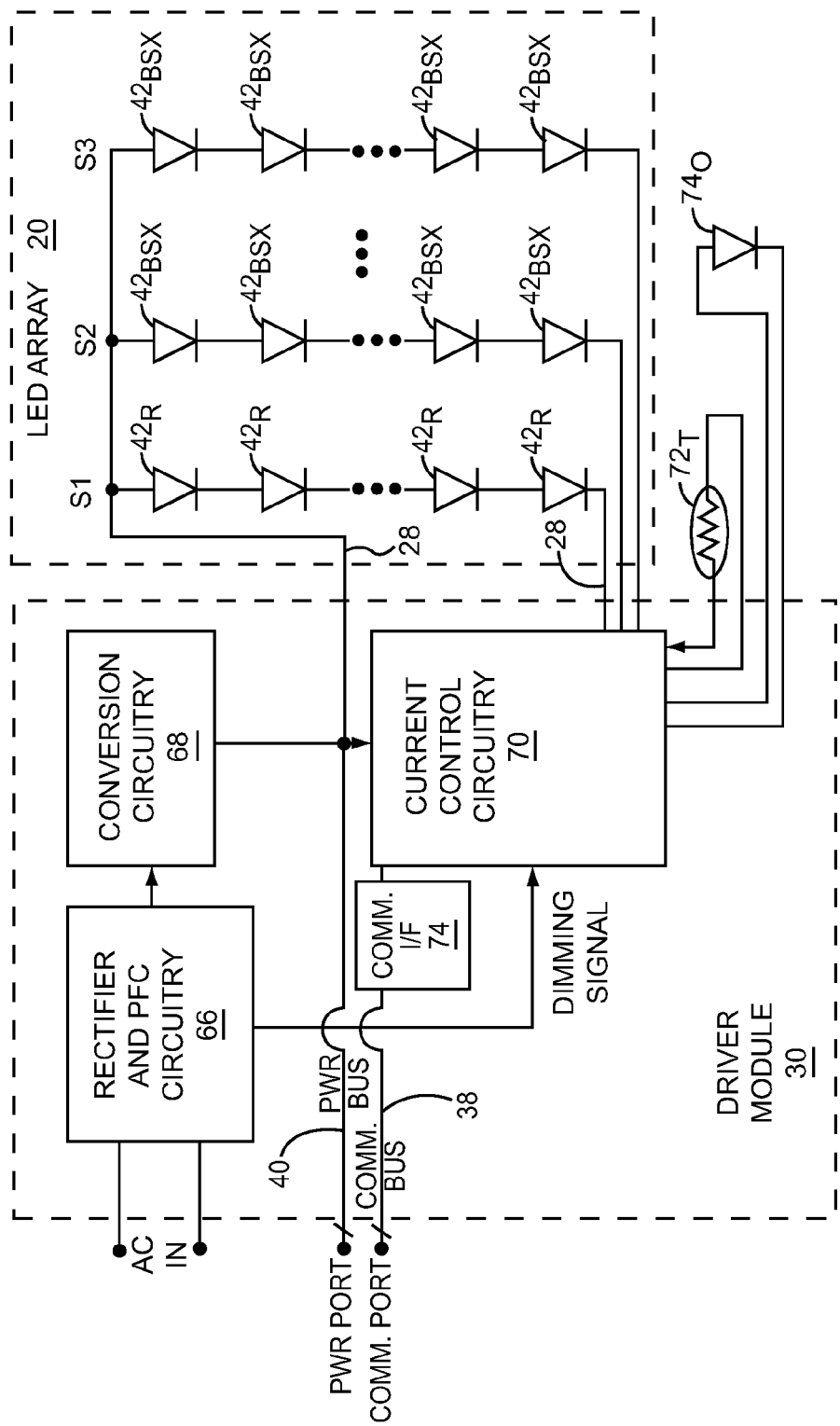
FIG. 9 is a schematic of a driver module and an LED array according to one embodiment of the disclosure.

As noted, the LED array 20 may include a mixture of red LEDs 42 and either BSY or BSG LEDs 42. The driver module 30 for driving the LED array 20 is illustrated in FIG. 9 according to one embodiment of the disclosure. The LED array 20 may be electrically divided into two or more strings of series connected LEDs 42. As depicted, there are three LED strings S1, S2, and S3. For clarity, the reference number "42" will include a subscript indicative of the color of the LED 42 in the following text where 'R' corresponds to red, 'BSY' corresponds to blue shifted yellow, 'MG' corresponds to blue shifted green, and 'BSX' corresponds to either BSG or BSY LEDs. LED string S1 includes a number of red LEDs 42R, LED string S2 includes a number of either BSY or BSG LEDs 42BSX, and LED string S3 includes a number of either BSY or BSG LEDs 42BSX. The driver module 30 controls the current delivered to the respective LED strings S1, S2, and S3. The current used to drive the LEDs 42 is generally pulse width modulated (PWM), wherein the duty cycle of the pulsed current controls the intensity of the light emitted from the LEDs 42.

The BSY or BSG LEDs $42_{BSX}$ in the second LED string S2 may be selected to have a slightly more bluish hue (less yellowish or greenish hue) than the BSY or BSG LEDs $42_{BSX}$ in the third LED string S3. As such, the current flowing through the second and third strings S2 and S3 may be tuned to control the yellowish or greenish light that is effectively emitted by the BSY or BSG LEDs $42_{BSX}$ of the second and third LED strings S2, S3. By controlling the relative intensities of the yellowish or greenish light emitted from the differently hued BSY or BSG LEDs $42_{BSX}$ of the second and third LED strings S2, S3, the hue of the combined yellowish or greenish light from the second and third LED strings S2, S3 may be controlled in a desired fashion.

The ratio of current provided through the red LEDs $42_R$ of the first LED string S1 relative to the currents provided through the BSY or BSG LEDs $42_{BSX}$ of the second and third LED strings S2 and S3 may be adjusted to effectively control the relative intensities of the reddish light emitted from the red LEDs $42_R$ and the combined yellowish or greenish light emitted from the various BSY or BSG LEDs $42_{BSX}$. As such, the intensity and the color point of the yellowish or greenish light from BSY or BSG LEDs $42_{BSX}$ can be set relative to the intensity of the reddish light emitted from the red LEDs $42_R$. The resultant yellowish or greenish light mixes with the reddish light to generate white light that has a desired color temperature and falls within a desired proximity of the BBL.

The driver module 30 depicted in FIG. 9 generally includes rectifier and power factor correction (PFC) circuitry 66, conversion circuitry 68, and current control circuitry 70. The rectifier and power factor correction circuitry 66 is adapted to receive an AC power signal (AC IN), rectify the AC power signal, and correct the power factor of the AC power signal. The resultant signal is provided to the conversion circuitry 68, which converts the rectified AC power signal to a DC power signal. The DC power signal may be boosted or bucked to one or more desired DC voltages by DC-DC converter circuitry, which is provided by the conversion circuitry 68. Internally, The DC power signal may be used to power the current control circuitry 70 and any other circuitry provided in the driver module 30.

The DC power signal is also provided to the power bus 40, which is coupled to one or more power ports, which may be part of the standard communication interface. The DC power signal provided to the power bus 40 may be used to provide power to one or more external devices that are coupled to the power bus and separate from the driver module 30. These external devices may include the control module 32 and any number of auxiliary devices, which are discussed further below. Accordingly, these external devices may rely on the driver module 30 for power and can be efficiently and cost effectively designed accordingly. The rectifier and PFC circuitry 66 and the conversion circuitry 68 of the driver module 30 are robustly designed in anticipation of being required to supply power to not only its internal circuitry and the LED array 20, but also to supply power to these external devices as well. Such a design greatly simplifies the power supply design, if not eliminating the need for a power supply, and reduces the cost for these external devices.

As illustrated, the DC power signal may be provided to another port, which will be connected by the cabling 28 to the LED array 20. In this embodiment, the supply line of the DC power signal is ultimately coupled to the first end of each of the LED strings S1, S2, and S3 in the LED array 20. The current control circuitry 70 is coupled to the second end of each of the LED strings S1, S2, and S3 by the cabling 28. Based on any number of fixed or dynamic parameters, the current control circuitry 70 may individually control the pulse width modulated current that flows through the respective LED strings S1, S2, and S3 such that the resultant white light emitted from the LED strings S1, S2, and S3 has a desired color temperature and falls within a desired proximity of the BBL. Certain of the many variables that may impact the current provided to each of the LED strings S1, S2, and S3 include: the magnitude of the AC power signal, the resultant white light, ambient temperature of the driver module 30 or LED array 20. Notably, the architecture used to drive the LED array 20 in this embodiment is merely exemplary, as those skilled in the art will recognize other architectures for controlling the drive voltages and currents presented to the LED strings S1, S2, and S3.

In certain instances, a dimming device controls the AC power signal. The rectifier and PFC circuitry 66 may be configured to detect the relative amount of dimming associated with the AC power signal and provide a corresponding dimming signal to the current control circuitry 70. Based on the dimming signal, the current control circuitry 70 will adjust the current provided to each of the LED strings S1, S2, and S3 to effectively reduce the intensity of the resultant white light emitted from the LED strings S1, S2, and S3 while maintaining the desired color temperature. Dimming instructions may alternatively be delivered from the control module 32 to the current control circuitry in the form of a command via the communication bus 38.

The intensity or color of the light emitted from the LEDs 42 may be affected by ambient temperature. If associated with a thermistor 72T or other temperature-sensing device, the current control circuitry 70 can control the current provided to each of the LED strings S1, S2, and S3 based on ambient temperature in an effort to compensate for adverse temperature effects. The intensity or color of the light emitted from the LEDs 42 may also change over time. If associated with an optical sensor $74_O$, the current control circuitry 70 can measure the color of the resultant white light being generated by the LED strings S1, S2, and S3 and adjust the current provided to each of the LED strings S1, S2, and S3 to ensure that the resultant white light maintains a desired color temperature or other desired metric.

The current control circuitry 70 may include a central processing unit (CPU) and sufficient memory to enable the current control circuitry 70 to bidirectionally communicate with the control module 32 or other devices over the communication bus 38 through an appropriate communication interface (I/F) 74 using a defined protocol, such as the standard protocol described above. The current control circuitry 70 may receive instructions from the control module 32 or other device and take appropriate action to implement the received instructions. The instructions may range from controlling how the LEDs 42 of the LED array 20 are driven to returning operational data, such as temperature or ambient light information, that was collected by the current control circuitry 70 to the control module 32 or other device via the communication bus 38.

Figure 10:
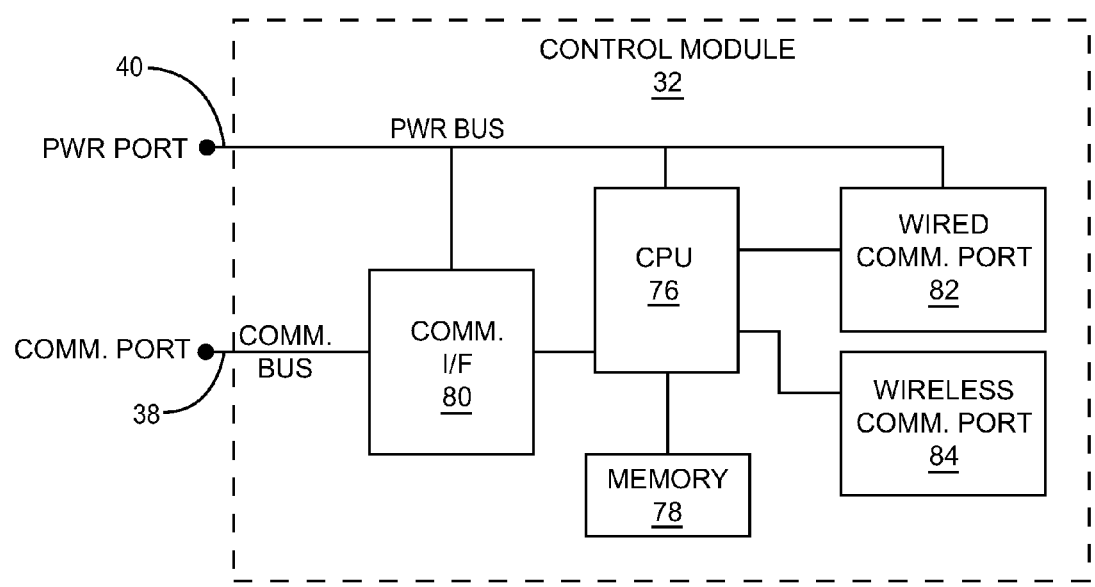
FIG. 10 is a block diagram of a control module according to one embodiment of the disclosure.

With reference to FIG. 10, a block diagram of one embodiment of the control module 32 is illustrated. The control module 32 includes a CPU 76 and associated memory 78 that contains the requisite software instructions and data to facilitate operation as described herein. The CPU 76 may be associated with a communication interface 80, which is to be coupled to the driver module 30, directly or indirectly via the communication bus 38. The CPU 76 may also be associated with a wired communication port 82, a wireless communication port 84, or both, to facilitate wired or wireless communications with the remote control system 36 or other device.

The capabilities of the control module 32 may vary greatly from one embodiment to another. For example, the control module 32 may act as a simple bridge between the driver module 30 and the remote control system 36. In such an embodiment, the CPU 76 will primarily pass commands received from the remote control system 36 to the driver module 30, and vice versa. The CPU 76 may translate the instructions as necessary based on the protocols being used to facilitate communications between the driver module 30 and the control module 32 as well as between the control module 32 and the remote control system 36. In other embodiments, the CPU 76 may be able to provide complete control of the driver module 30 independent of any instructions or interaction with the remote control system 36. While the control module 32 may be able to control the driver module 30 by itself, the CPU 76 may also be configured to receive supplemental instructions from the remote control system 36 or switch over to allowing the remote control system 36 to directly control the driver module 30, as the designer or application dictates.

Power for the CPU 76, memory 78, the communication interface 80, and the wired and/or wireless communication ports 82 and 84 may be over the power bus 40 via the power port. As noted above, the power bus 40 may receive its power from the driver module 30, which generates the DC power signal. As such, the control module 32 may not need to be connected to AC power or include rectifier and conversion circuitry. The power port and the communication port may be separate or may be integrated with the standard communication interface. The power port and communication port are shown separately for clarity. The communication bus 38 may take many forms. In one embodiment, the communication bus 38 is a 2-wire serial bus, wherein the connector or cabling configuration may be configured such that the communication bus 38 and the power bus 40 are provided using four wires: data, clock, power, and ground.

Figure 11:
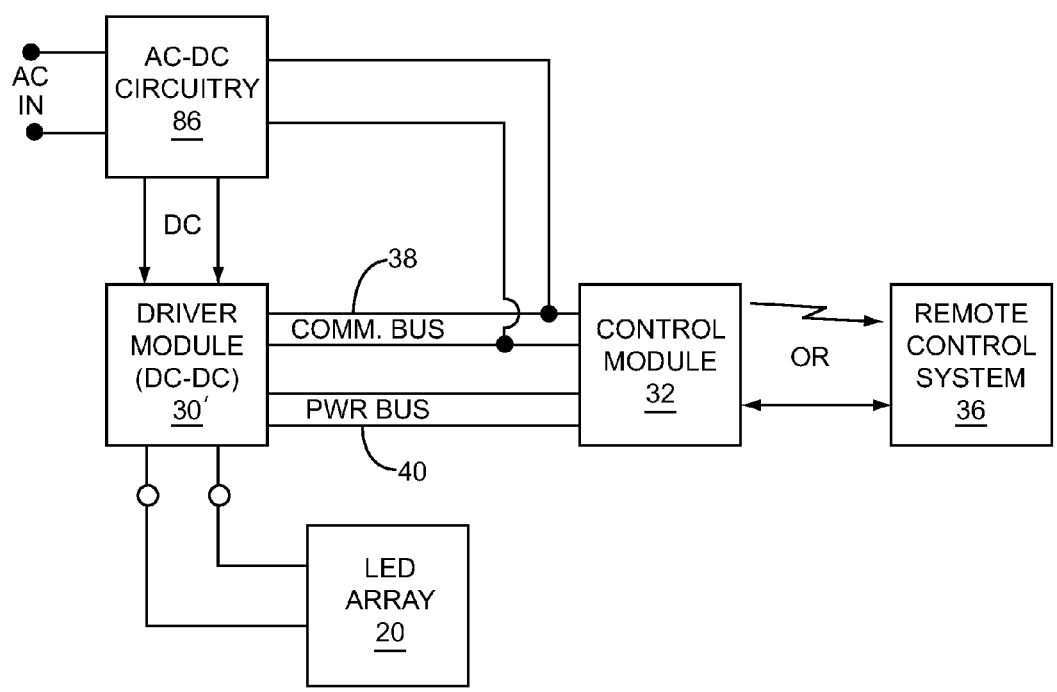
FIG. 11 is a block diagram of a lighting system according to a second embodiment of the disclosure.

The modular concepts of the present disclosure may be taken a step further, wherein various components of the driver module 30 may be broken into different modules. As shown in FIG. 11, a driver module 30' is provided, wherein the electronics for converting the AC input signal (AC IN) to a rectified or DC state is removed from the driver module 30' and provided in a separate module, which is labeled AC-DC circuitry 86. The driver module 30' may include additional DC-DC conversion circuitry to take the signal provided by the AC-DC circuitry 86 and convert it to an appropriate DC voltage level for operating the electronics of the driver module 30' as well as to power the power bus 40. Again, power from the power bus 40 may be used by the control module 32 or other devices coupled to the power bus 40. In more sophisticated embodiments, the AC-DC circuitry 86 has at least basic processing and communication capabilities, such that the AC-DC circuitry 86 can communicate with the driver module 30', control module 32, or both over the communication bus 38. As such, the AC-DC circuitry 86 is modular, can be added to the lighting system at any time, and may be controlled by or provide information to the driver module 30' and the control module 32.

For example, the AC-DC circuitry 86 may be capable of providing DC power signals at different levels (e.g. 5 volt, 10 volt, 12 volt, or 24V) for different lighting applications or systems. The driver module 30' and the control module 32 may be able to instruct the AC-DC circuitry 86 to output a desired DC voltage based on the requirements of the driver module 30'. Further, dimming information, voltage levels for the AC input signal (AC IN), or the like may be provided to the driver module 30' or the control module 32 and used to control the driver module 30' or other device in the lighting system.

Figure 12:
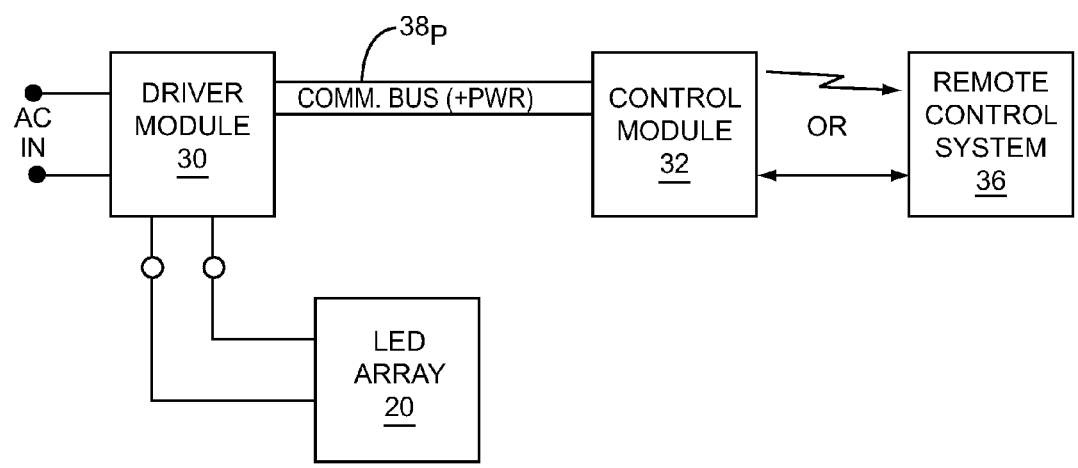
FIG. 12 is a block diagram of a lighting system according to a third embodiment of the disclosure.

With reference to FIG. 12, an embodiment is shown wherein the communication bus 38 and the power bus 40 are effectively combined to provide a communication bus $38_P$ that not only supports bidirectional communications, but also provides DC power. In a 4-wire system, two wires may be used for data and clock signals, and another two wires may be used for power and ground.

Figure 13:
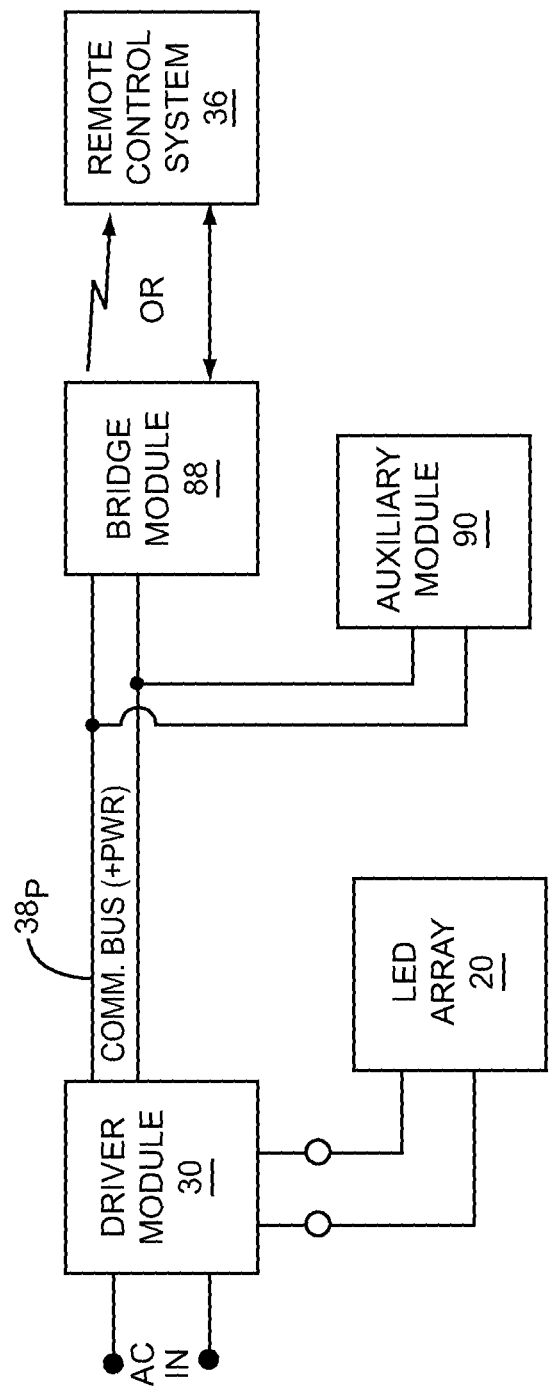
FIG. 13 is a block diagram of a lighting system according to a fourth embodiment of the disclosure.

Up to this point, the primary control for the driver module 30, and thus for the lighting fixture 10, has been provided directly by the control module 32 or by the remote control system 36 via the control module 32. With reference to FIG. 13, with the availability of the communication bus $38_P$ (or communication bus 38), any number of auxiliary modules 90 may be coupled to the communication bus $38_P$ and used to control the driver module 30 or receive information from the driver module 30.

As shown in FIG. 13, the driver module 30, a bridge module 88, and an auxiliary module 90 are all coupled to the communication bus $38_P$ and configured to use a standard protocol to facilitate communications therebetween. The bridge module 88, which may be configured similarly to the control module 32, acts as a liaison or translator between the remote control system 36 and the various modules coupled to the communication bus $38_P$. Accordingly, the bridge module 88 may provide any necessary protocol conversion for messages being passed between either the driver module 30 or auxiliary module 90 and the remote control system 36. The auxiliary module 90 may be configured to control the driver module 30 in a unique or supplemental way, wherein different auxiliary modules 90 may be used to provide different types of control for the driver module 30 based on different lighting applications or requirements. For example, one auxiliary module 90 may control the driver module 30 such that the lighting fixture 10 operates in a traditional fashion, wherein another auxiliary module 90 may operate the driver module 30 such that the lighting fixture 10 operates like an emergency lighting fixture, which turns on during a power failure.

Figure 14:
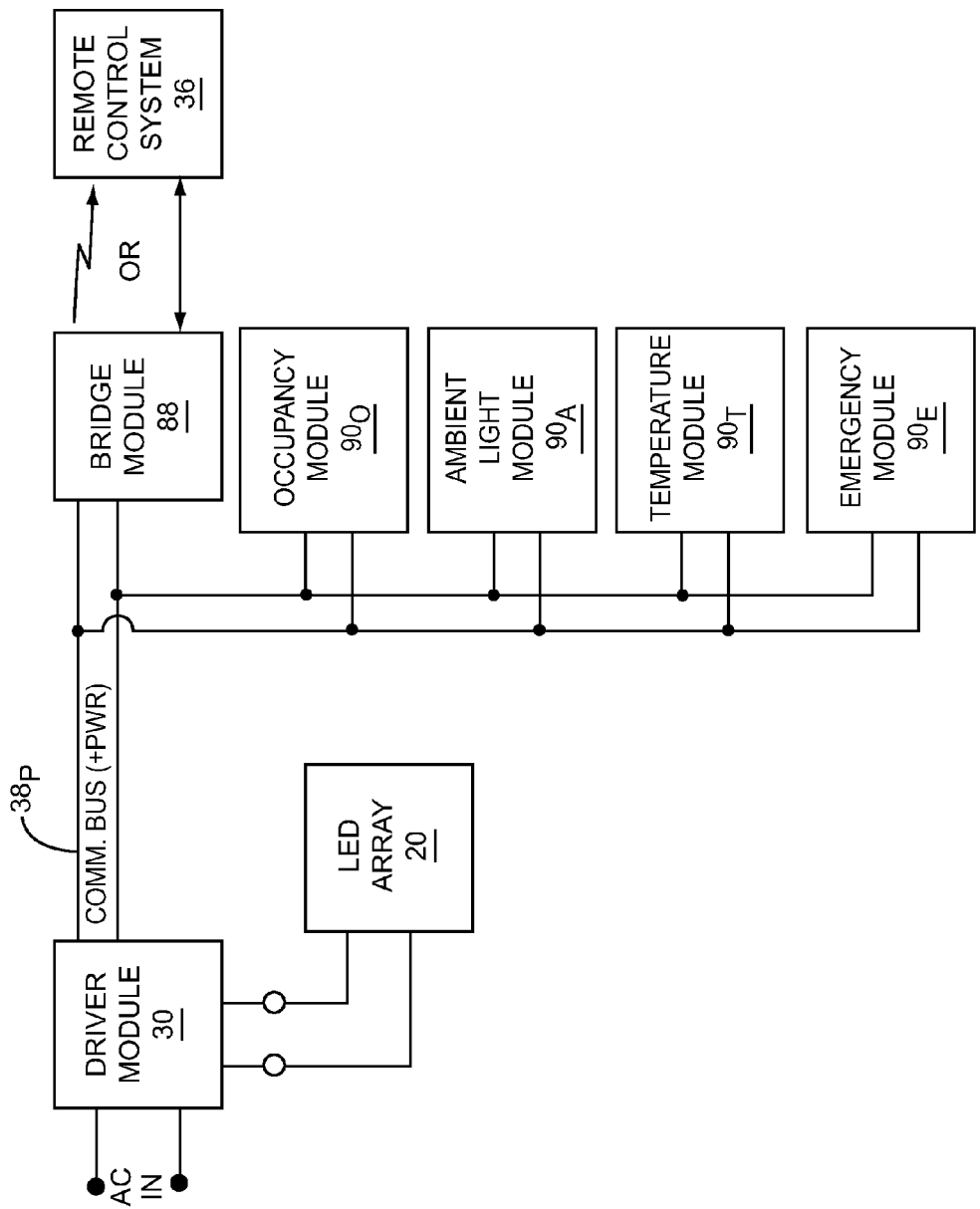
FIG. 14 is a block diagram of a lighting system according to a fifth embodiment of the disclosure.

While any number of functions or control techniques may be employed by an auxiliary module 90, several examples are shown in FIG. 14. As illustrated, the bridge module 88 facilitates communications between the remote control system 36 and the driver module 30, as well as any of the auxiliary modules 90. The illustrated auxiliary modules include: an occupancy module $90_O$, an ambient light module $90_A$, a temperature module $90_T$, and an emergency module $90_E$. The occupancy module $90_O$ may be configured with an occupancy sensor and function to control the driver module 30 based on whether the room in which the lighting fixture 10 is mounted is occupied. If the room is occupied, the driver module 30 will be instructed to drive the LED array 20 such that the lighting fixture 10 is effectively turned on. If the room is not occupied, the occupancy module $90_O$ may control the driver module 30 such that the LED array 20 is turned off.

The ambient light module $90_A$ may include an ambient light sensor that is capable of measuring ambient light, determining the characteristics of the ambient light, and then instructing the driver module 30 to drive the LED array 20 in a manner based on the amount or characteristics of the ambient light. For example, if there is a lot of ambient light, the ambient light module $90_A$ may instruct the driver module 30 to only drive the LED array 20 to a level corresponding to 20% of its maximum light output. If there is little or no ambient light, the ambient light module $90_A$ may instruct the driver module 30 to drive the LED array 20 at or near maximum capacity. In more sophisticated embodiments, the ambient light module $90_A$ may analyze the quality of the ambient light and instruct the driver module 30 to drive the LED array 20 in a manner based on the quality of the ambient light. For example, if there is a relatively large amount of reddish light in the ambient light, the ambient light module $90_A$ may instruct the driver module 30 to drive the LED array 20 such that the less efficient, red LEDs $42_R$ are driven at a lower level than normal to improve the overall efficiency of the lighting fixture 10.

The temperature module $90_T$ may include a sensor capable of determining the ambient temperature of the room, the LED array 20, or electronics associated with any of the modules, and instruct the driver module 30 to drive the LED array 20 in an appropriate fashion. For any of these modules, they may also monitor occupancy, ambient light characteristics, or temperature levels, and provide this information to the remote control system 36, which may process all of the information alone or in combination and determine how to instruct the driver module 30 to drive the LED array 20. Thus, the various auxiliary modules 90 may directly instruct the driver module 30 to drive the LED array 20 in a certain way, or they may provide information to the bridge module 88 or the remote control system 36, which would provide such control. Further, control may be shared amongst the auxiliary modules 90, the bridge module 88, the remote control system 36, or any combination thereof.

The last illustrated auxiliary module is an emergency module $90_E$. The emergency module $90_E$ illustrates an application type module, wherein the overall lighting fixture 10 may be converted to operate as an emergency lighting fixture when associated with the emergency module $90_E$. The emergency module $90_E$ may be able to communicate with the driver module 30 and determine the state of the AC input signal (AC IN), the operational state of the driver module 30, or the like, and then control the driver module 30 in an appropriate fashion. For example, if there is a power failure in the AC input signal (AC IN), the emergency module $90_E$ may instruct the driver module 30 to switch over to a battery backup supply (not shown) and drive the LED array 20 at an appropriate level for an emergency lighting condition. The emergency module $90_E$ may also retrieve various metrics for the AC input signal (AC IN), the driver module 30, or the LED array 20, and pass this information to the remote control system 36 through the bridge module 88, or simply use this information to determine how to control the driver module 30.

For the various modules that are coupled to the communication bus 38, one embodiment assigns a unique ID to each of the modules, such that they can be uniquely identified by one or more of the other modules. The identifiers may also correspond to the functionality or type of module. As such, the driver module 30 may be able to identify the various auxiliary modules 90 and bridge module 88 that reside on the communication bus 38 and recognize the functionality provided by those modules. As such, the driver module 30 (or bridge module 88) can prioritize commands received by the various modules and manage conflicts between the auxiliary modules 90 and the bridge module 88.

Each command may include a source identifier, a recipient identifier, and an instruction or payload of data. The various modules on the communication bus 38 can process the commands to determine whether the command should be acted upon or ignored. The table below illustrates a 3-bit pattern for identifying various types of devices that may appear on the communication bus 38.

| | |
|---|---|
| Occupancy Module | 0 0 0 |
| Ambient Light Module | 0 0 1 |
| Bridge Module | 0 1 0 |
| Temperature Module | 0 1 1 |
| LED Array | 1 0 0 |
| Driver Module | 1 0 1 |
| Emergency Module | 1 1 1 |

The following is an exemplary command set for the embodiment shown in FIG. 14. The left column is the name of the command, the second column provides the source of the command, the third column provides the recipient of the command, and the fourth column is a description of the command.

| Command | Source | Recipient | Description |
|---|---|---|---|
| Light Level Control | Bridge Module | Driver Module | Light Level |
| On/Off | Bridge Module | Driver Module | On/Off |
| Color Temperature | Bridge Module | Driver Module | Color temperature of solid state light |
| Fixture ID | Driver Module | Bridge Module | Solid State light id |
| Health | Driver Module | Bridge Module | Health of solid state light |
| Power Usage | Driver Module | Bridge Module | Power used by solid state light |
| Usage | Driver Module | Bridge Module | Hours of use |
| Lifetime | Driver Module | Bridge Module | Useful life (factors hours, ambient temp and power level) |
| On/Off | Occupancy Module | Driver Module | On/Off |
| Delay Time | Bridge Module | Driver Module | Delay time for off from occupancy sensor |
| Light Level Control | Ambient Light Module | Driver Module | Light Level |
| Temperature | Temperature Module | Driver Module | Solid State temperature level (protection) |
| Emergency Health | Emergency Module | Bridge Module | Battery State |
| Emergency Test | Bridge Module | Emergency Module | Remote method to allow testing of emergency solid state fixture |
| Emergency Pass | Emergency Module | Bridge Module | Pass indication for emergency test |

Based on the above, this embodiment of the disclosure allows for an open system, wherein various auxiliary modules 90 may be coupled to the lighting fixture 10 and be able to communicate with other auxiliary modules 90, the driver module 30, or a remote control system 36 via the bridge module 88 in virtually any desired fashion. The bridge module 88 is capable of interacting with a variety of existing remote control systems 36, such as those provided by Lutron, Crestron, Dali, DMX, or the like, and provide the necessary protocol conversion between the proprietary protocols used by remote control systems 36 of these and other companies to the standard protocol that is used by the various modules that are coupled to the communication bus 38. Thus, a standard protocol is used to allow each of the modules on the communication bus 38 to communicate with each other and with the bridge module 88, wherein the bridge module 88 acts as a gateway to any number of other remote control systems 36, which may likely use a different protocol. The protocol used for the various modules coupled to the communication bus 38 should define the expected communications and the format of those communications that will occur between the various modules.

The bridge module 88 may be designed to use a single protocol to use when communicating with a remote control system 36 of a particular provider. Alternatively, the bridge module 88 may be configured to use any number of protocols for communications with the remote control system 36. Selection of the appropriate protocol to use when communicating with the remote control system 36 may be automatically selected or manually provisioned through any appropriate interface, use of dip switch settings, and the like. For automatic selection, the bridge module 88 may employ various discovery techniques to determine the protocol to use when communicating with the remote control system 36. In one embodiment, the bridge module 88 may receive a message from the remote control system 36 and analyze the format of the message to determine the specific protocol that was used to send the message. Once the specific protocol is determined, the bridge module will communicate with the remote control system 36 using that protocol. In other embodiments, the bridge module 88 may engage in a handshaking procedure to discover the protocol to use when communicating with the remote control system 36. The handshaking protocol may be initiated by either of the bridge module 88 or the remote control system 36 in different embodiments.

Figure 15:
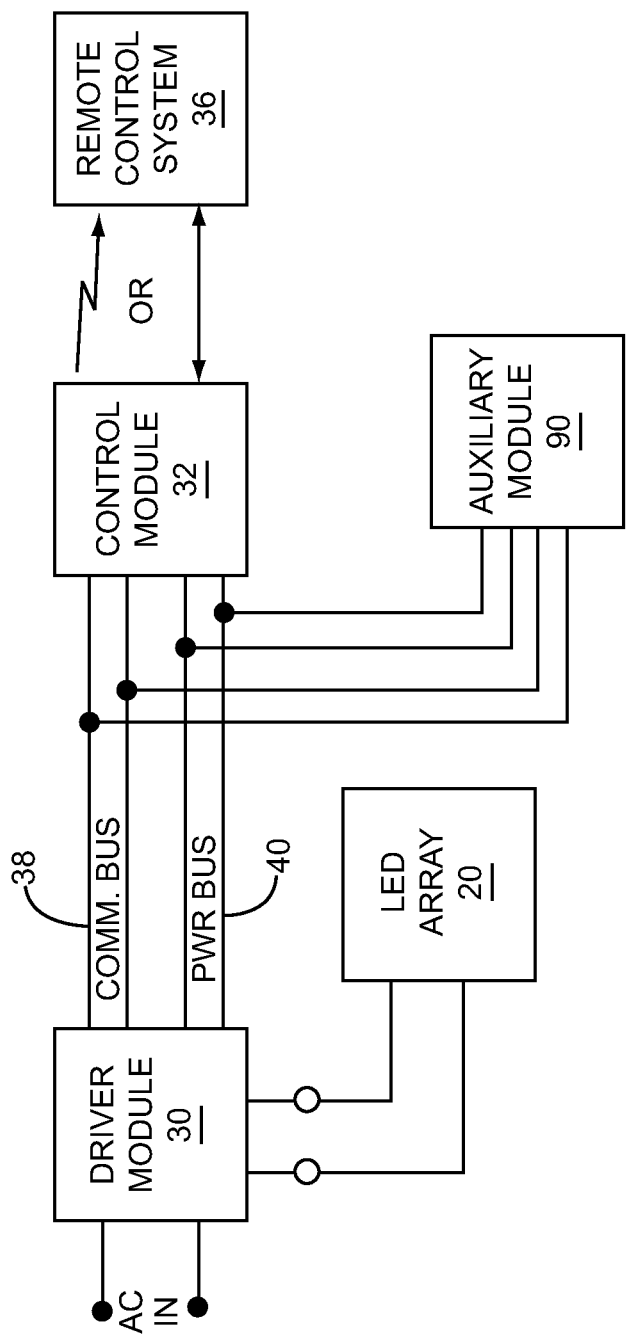
FIG. 15 is a block diagram of a lighting system according to a sixth embodiment of the disclosure.

FIG. 15 illustrates a lighting system wherein a separate communication bus 38 and power bus 40 are used for the driver module 30, bridge module 88, and any auxiliary modules 90. Again, any of the modules in the system may receive power from the driver module 30 via the power bus 40. Communications are provided over the communication bus 38, as described above.

Figure 16:
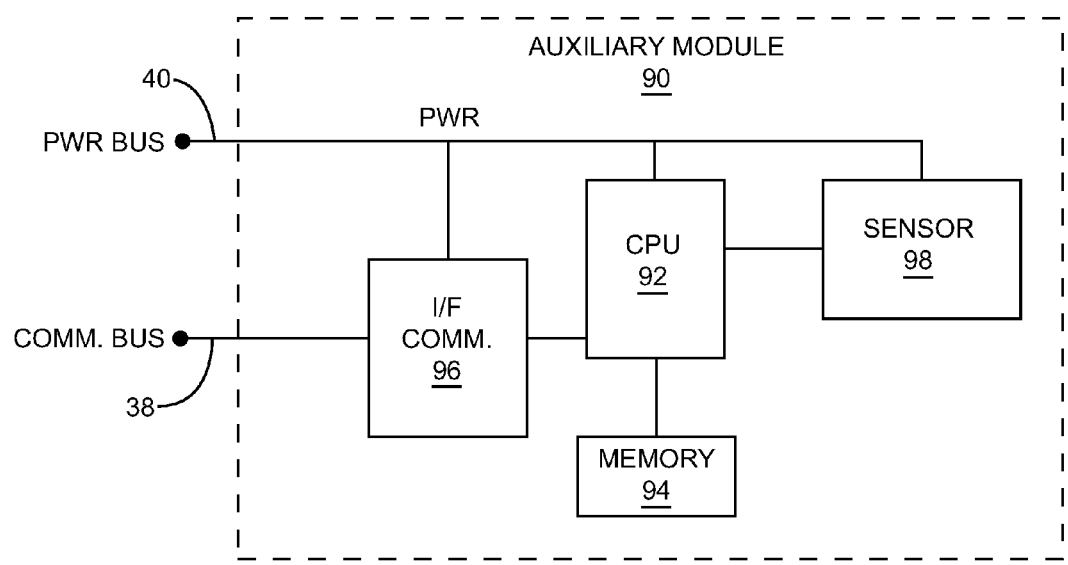
FIG. 16 is a block diagram of an auxiliary module according to one embodiment of the disclosure.

With reference to FIG. 16, an exemplary auxiliary module 90 is shown according to one embodiment of the disclosure. The auxiliary module 90 may include a CPU 92 associated with memory 94, which includes sufficient software instructions and data to allow the auxiliary module 90 to operate as described above. A communication interface 96 is associated with the CPU 92 to facilitate communications over the communication bus 38. Further, one or more sensors 98 may be associated with the CPU 92 based on the particular functionality of the auxiliary module 90. For example, if the auxiliary module 90 is a temperature module $90_T$, the sensor 98 may be a temperature sensor. Power may be supplied to the various components of the auxiliary module 90 via the power bus 40, such that the auxiliary module 90 does not need the electronics necessary to convert the AC input signal (AC IN) to a DC level sufficient to power the electronics. The bridge module 88 is configured in an analogous fashion to the control module 32 as described above.

Figure 17:
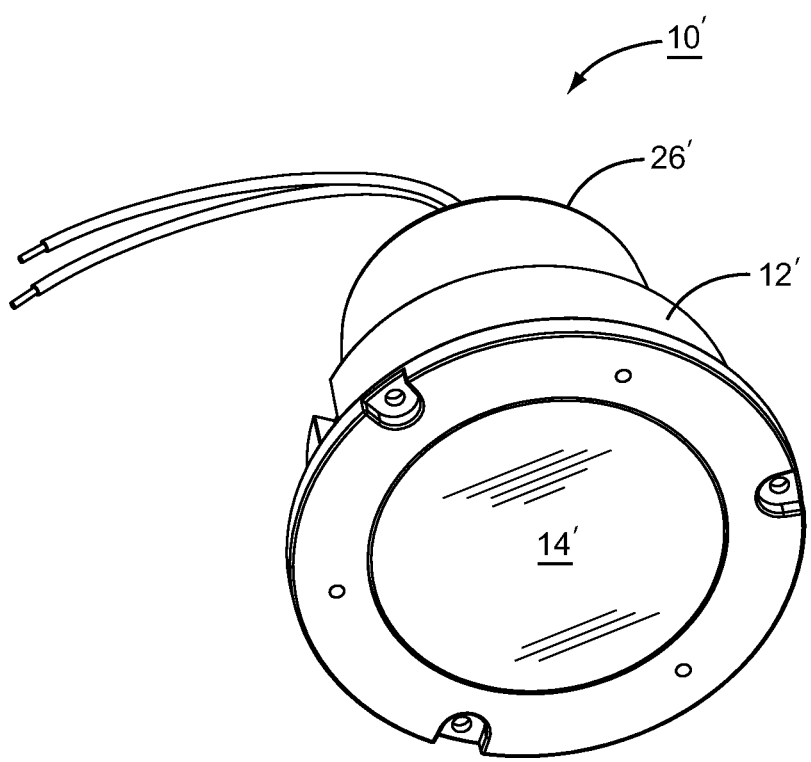
FIG. 17 is an alternative lighting fixture configuration according to a second embodiment of the disclosure.

While the embodiments described above were focused on a troffer-type lighting fixture 10, the concepts disclosed herein apply to any type of lighting fixture. For example, a recessed-type lighting fixture 10' as illustrated in FIG. 17 may also incorporate all of the concepts described above. As illustrated, the lighting fixture 10' includes a main housing 12', a lens 14', and an electronics housing 26'. The various modules described above may be housed within the electronics housing 26' or attached thereto, outside of or within supplemental plenum rated enclosures. These configurations will vary based on the particular application. However, the concepts of a modular system that allows any of the modules to be readily replaced and new modules added are considered to be within the scope of the present disclosure and the claims that follow.

Those skilled in the art will recognize improvements and modifications to the embodiments of the present disclosure. All such improvements and modifications are considered within the scope of the concepts disclosed herein and the claims that follow.

What is claimed is:

1. A lighting fixture comprising:
   an array of LEDs;
   a control module; and
   a driver module associated with the control module, the driver module comprising:
      a communication port and a power port;
      control circuitry that facilitates communications with the control module via a communication bus coupled to the communication port and drives the array of LEDs, at least in part, in response to a command received from the control module via the communication port; and
      rectifying circuitry and conversion circuitry adapted to convert an AC input signal into at least one DC power signal that is used to supply power to the control circuitry within the driver module, the control module via the power port, and the array of LEDs wherein power is not provided by the control module to the driver module or the array of LEDs.

2. The lighting fixture of claim 1 wherein the control circuitry is adapted to facilitate bidirectional communications with the control module using a standard communication protocol via the communication bus.

3. The lighting fixture of claim 1 wherein the driver module comprises a first connector that comprises the communication port and the power port and is adapted to receive a second connector of the control module, such that the driver module and the control module are electronically and mechanically coupled together when the first connector receives the second connector.

4. The lighting fixture of claim 3 wherein the first connector is mounted on a printed circuit board on which control circuitry for the driver module is formed and the control circuitry is adapted to drive the array of LEDs.

5. The lighting fixture of claim 1 further comprising a lighting fixture housing in which the array of LEDs is mounted and an electronics housing attached to the lighting fixture housing, wherein the driver module is mounted within the electronics housing.

6. The lighting fixture of claim 1 further comprising a lighting fixture housing in which the array of LEDs is mounted and an electronics housing attached to the lighting fixture housing, wherein the driver module is mounted outside the electronics housing.

7. The lighting fixture of claim 1 further comprising a supplemental housing that houses the control module and is attached to an electronics housing of the lighting fixture.

8. The lighting fixture of claim 1 further comprising a lighting fixture housing in which the array of LEDs is mounted, and the control module is mounted to an outside surface of an electronics housing of the lighting fixture.

9. The lighting fixture of claim 1 wherein the control module is further adapted to generate the command provided to the driver module based on commands received from a remote control system and send information received from the driver module to the remote control system.

10. The lighting fixture of claim 9 wherein the control module is further adapted to communicate with the driver module using a first protocol and to communicate with the remote control system using a second protocol, which is different from the first protocol.

11. The lighting fixture of claim 1 wherein communications between the driver module and the control module are serial communications.

12. The lighting fixture of claim 1 wherein the array of LEDs comprises a plurality of LEDs of a first type and a plurality of LEDs of a second type, which is different than the first type.

13. The lighting fixture of claim 1 further comprising the control module wherein the control module is coupled to the lighting fixture and comprises:
   a communication interface coupled to the communication bus, wherein the driver module communication port is coupled to the communication bus;
   a power port for receiving power from the driver module; and
   a central processing unit that receives power from the power port such that the central processing unit receives power from the control module and is adapted to provide a command instructing the driver module how to drive the array of LEDs in the lighting fixture via the control module communication interface.

* * * * *

UNITED STATES PATENT AND TRADEMARK OFFICE
CERTIFICATE OF CORRECTION

PATENT NO. : 10,506,678 B2
APPLICATION NO. : 13/589928
DATED : December 10, 2019
INVENTOR(S) : Harris et al.

It is certified that error appears in the above-identified patent and that said Letters Patent is hereby corrected as shown below:

In the Specification

In Column 5, Line 55, replace "housing snap-fit or hook-and-snap mechanisms" with --housing using snap-fit or hook-and-snap mechanisms--.

In Column 11, Line 63, replace "'MG'" with --'BSG'--.

Signed and Sealed this
Twenty-eighth Day of January, 2020

Andrei Iancu
*Director of the United States Patent and Trademark Office*